US012749606B2

(12) United States Patent
Zhou

(10) Patent No.: US 12,749,606 B2
(45) Date of Patent: Sep. 29, 2026

(54) MAGNETIC DEVICE FOR SORTING BIOLOGICAL OBJECTS

(71) Applicant: Applied Cells Inc., Santa Clara, CA (US)

(72) Inventor: Yuchen Zhou, San Jose, CA (US)

(73) Assignee: Applied Cells Inc., Fremont, CA (US)

( * ) Notice: Subject to any disclaimer, the term of this patent is extended or adjusted under 35 U.S.C. 154(b) by 732 days.

(21) Appl. No.: 18/072,362

(22) Filed: Nov. 30, 2022

(65) Prior Publication Data

US 2023/0102744 A1 Mar. 30, 2023

Related U.S. Application Data

(63) Continuation-in-part of application No. 16/729,398, filed on Dec. 29, 2019, now Pat. No. 11,571,696, which is a continuation-in-part of application No. 15/911,115, filed on Mar. 3, 2018, now Pat. No. 12,145,151.

(60) Provisional application No. 63/406,437, filed on Sep. 14, 2022.

(51) Int. Cl.

| | |
|---|---|
| ***H01F 7/06*** | (2006.01) |
| ***B01L 3/00*** | (2006.01) |
| ***H01F 1/12*** | (2006.01) |
| ***H01F 7/02*** | (2006.01) |
| ***H01F 7/20*** | (2006.01) |

(52) U.S. Cl.

CPC ........ *H01F 7/064* (2013.01); *B01L 3/502761* (2013.01); *H01F 1/12* (2013.01); *H01F 7/02* (2013.01); *H01F 7/20* (2013.01); *B01L 2200/0652* (2013.01); *B01L 2300/0645* (2013.01); *B01L 2400/043* (2013.01)

(58) Field of Classification Search

None

See application file for complete search history.

(56) References Cited

U.S. PATENT DOCUMENTS 5,705,059 A 1/1998 Miltenyi
5,711,871 A 1/1998 Miltenyi
6,254,830 B1 7/2001 Pivarnik et al.
(Continued)

FOREIGN PATENT DOCUMENTS

WO 2009132151 10/2009

OTHER PUBLICATIONS

Adams et al., Integrated acoustic and magnetic separation in microfluidic channels, Applied Physics Letters, 2009, 254103, vol. 95.
(Continued)

*Primary Examiner* — Jonathan M Peo

(57) ABSTRACT

A magnetic device includes a soft magnetic center pole having a tapered tip end, first and second soft magnetic side poles disposed on opposite sides of the soft magnetic center pole, and a magnetic flux source generating magnetic flux in the soft magnetic center pole and the first and second soft magnetic side poles. The first and second soft magnetic side poles have first and second top ends, each end having a chisel edge profile with a bevel side. The magnetic device further includes a flexible conduit nestled in a gap formed between the tapered tip end and the bevel sides of the first and second top ends and a soft magnetic press operable to push and deform the flexible conduit nestled in the gap.

13 Claims, 30 Drawing Sheets

(56) References Cited

U.S. PATENT DOCUMENTS

| | | | |
|---|---|---|---|
| 6,417,011 B1 | 7/2002 | Miltenyi | |
| 6,602,422 B1 | 8/2003 | Miltenyi et al. | |
| 6,954,128 B2 * | 10/2005 | Humphries | B03C 1/0332 335/306 |
| 7,348,185 B2 | 3/2008 | Yamamichi | |
| 7,474,184 B1 * | 1/2009 | Humphries | B03C 1/0332 436/526 |
| 7,781,202 B2 | 8/2010 | Yamamichi | |
| 8,513,029 B2 | 8/2013 | Zhou | |
| 8,636,906 B2 | 1/2014 | Stein | |
| 8,956,536 B2 | 2/2015 | Yu et al. | |
| 8,986,944 B2 | 3/2015 | Yamanishi et al. | |
| 9,217,131 B2 | 12/2015 | Amish et al. | |
| 9,513,205 B2 | 12/2016 | Yu et al. | |
| 9,551,643 B2 | 1/2017 | Warner et al. | |
| 9,835,540 B2 | 12/2017 | Yu et al. | |
| 9,885,642 B2 | 2/2018 | Yu | |
| 10,045,913 B2 | 8/2018 | Warner et al. | |
| 10,444,125 B2 | 10/2019 | Yu | |
| 10,677,695 B2 | 6/2020 | Koyata et al. | |
| 2006/0240572 A1 | 10/2006 | Carron et al. | |
| 2007/0182517 A1 | 8/2007 | Humphries et al. | |
| 2008/0302732 A1 | 12/2008 | Soh et al. | |
| 2009/0065359 A1 | 3/2009 | Zhou | |
| 2010/0317093 A1 | 12/2010 | Turewicz et al. | |
| 2012/0100546 A1 | 4/2012 | Lowery et al. | |
| 2012/0122731 A1 | 5/2012 | Soh et al. | |
| 2012/0295302 A1 | 11/2012 | Lamish et al. | |
| 2013/0265054 A1 | 10/2013 | Lowery et al. | |
| 2013/0266944 A1 | 10/2013 | Neely et al. | |
| 2013/0330739 A1 * | 12/2013 | Yu | B03C 1/0332 435/7.1 |
| 2014/0120570 A1 | 5/2014 | Yu et al. | |
| 2015/0010939 A1 | 1/2015 | Warner et al. | |
| 2015/0177111 A1 | 6/2015 | Warner et al. | |
| 2016/0252445 A1 | 9/2016 | Yu et al. | |
| 2019/0270084 A1 * | 9/2019 | Zhou | G01N 35/0098 |

OTHER PUBLICATIONS

Benez et al., Detection of circulating melanoma cells by immunomagnetic cell sorting, Journal of Clinical Laboratory Analysis, 1999, 229-233, vol. 13.

Inuma et al., Detection of tumor cells in blood using CD45 magnetic cell separation followed by nested mutant allele-specific amplification of p53 and K-ras genes in patients with colorectal cancer, International Journal of Cancer, 2000, 337-344, vol. 89.

Xia et al., Combined microfluidic-micromagnetic separation of living cells in continuous flow, Biomedical Microdevices, 2006, 299-308, vol. 8.

Pamme et al., Continuous sorting of magnetic cells via on-chip free-flow magnetophoresis, Lab on a Chip, 2006, 974-980, vol. 6.

* cited by examiner

DIRECT LABELING

INDIRECT LABELING

MAGNETIC DEVICE FOR SORTING BIOLOGICAL OBJECTS

CROSS-REFERENCE TO RELATED APPLICATIONS

The present application claims priority to provisional application No. 63/406,437, filed on Sep. 14, 2022, and is a continuation-in-part of application Ser. No. 16/729,398, filed on Dec. 29, 2019, now U.S. Pat. No. 11,571,696, which is a continuation-in-part of application Ser. No. 15/911,115, filed on Mar. 3, 2018, now U.S. Pat. No. 12,145,151. All of these applications are incorporated herein by reference in their entirety, including their specifications.

BACKGROUND

The present invention relates to a device for sorting biological objects, and more particularly, to embodiments of a magnetic device for sorting magnetic or magnetically labeled biological objects in a fluid.

The separation and sorting of biological objects or cells is critical to various biomedical applications, such as diagnostics and therapeutics. Biological cells may be sorted based on their respective physical properties, such as size and density, and biochemical properties, such as surface antigen expression.

In magnetic force-based separation, a cell, which typically is not magnetic, can be magnetized for magnetic sorting purpose by attaching antibody-conjugated magnetic beads thereto, a process also known as magnetic labeling. FIG. 1A shows a cell 50 including a plurality of surface markers or antigens 52 on the cell surface thereof, and a plurality of antibody-conjugated magnetic beads 54 suspended in a fluid. Each of the antibody-conjugated magnetic beads 54 includes a magnetic particle 56 conjugated with one or more antibodies or other ligands 58, such as peptides and aptamers, that correspond to the surface markers 52. After an incubation period, the magnetic beads 54 may be directly attached to the cell 50 via the antigen-antibody interaction to form a magnetically labeled cell as shown in FIG. 1B, in a process known as direct labeling.

Alternatively, magnetic beads may be attached to a cell through an indirect labeling process. FIG. 2A shows a cell 50 including a plurality of surface markers or antigens 52 on the cell surface thereof, a plurality of intermediary links 60, and a plurality of magnetic beads 62 suspended in a fluid. Each of the intermediary links 60 includes one or more linking molecules 64, such as biotin or phycoerythrin (PE), conjugated to a primary antibody 66 that corresponds to the surface markers 52 of the cell 50. Each of the magnetic beads 62 includes a magnetic particle 56 conjugated with one or more secondary antibodies or ligands 68, such as streptavidin, that target the linking molecules 64. After an incubation period, the intermediary links 60 may attach to the cell 50 via the antigen-antibody interaction, and the magnetic beads 62 may further attach to the intermediary links 60 via PE-antibody, biotin-streptavidin, or other types of interactions, thereby forming a magnetically labeled cell as shown in FIG. 2B.

After cells in sample fluid are magnetically labeled, they can be sorted or separated from the other non-labeled cells or biological objects in the sample fluid by a magnetic separator device. FIG. 3A shows a conventional magnetic separator device 70 comprising a container vessel 72 for holding the sample fluid 74 that contains the magnetically labeled cells 76 and a permanent magnet 78 placed in close proximity to a wall of the container vessel 72. The permanent magnet 78 generates a magnetic field in the container vessel 72 with the magnetic field gradient pointing towards the permanent magnet 78. After sufficient time, the magnetically labeled cells 76 will be gradually pulled by the force produced by the magnetic field towards the vessel wall and form an aggregate at the vessel wall, as shown in FIG. 3B. Because the magnetic field strength rapidly decreases as the distance from the permanent magnet 78 increases, the size of the vessel 72 and the sample fluid volume will be adversely limited.

FIG. 4 illustrates another conventional magnetic separator device 80 that separates magnetically labeled cells in a static fluid sample contained in one or more wells 82. The magnetic device 80 uses multiple ferromagnetic poles 84, each of which has a trapezoidal tip, to concentrate the magnetic flux generated by multiple permanent magnets 86 attached thereto to increase the magnetic field strength and gradient near their tips. The corresponding magnetic field distribution, as delineated by magnetic field lines 88, shows that the magnetic field is strongest between the side surfaces of adjacent trapezoidal tips, as indicated by the small spacing between the field lines 88. By contrast, the magnetic field gradient is much weaker above the pole tips, as indicated by the large spacing between the field lines 88. Accordingly, this necessitates the bottom portion of each well 82 to be disposed between the side surfaces of the pole tips, where the magnetic field is strong. The magnetically labeled cells in the conical-shaped wells 82 will be collected or condensed in or near the bottom of the wells 82 adjacent to the side surfaces of the trapezoidal tips of the ferromagnetic poles 84. Compared with the magnetic separator device 70 utilizing only the permanent magnet 78, the magnetic separator device 80 can improve the magnetic field and gradient by using the ferromagnetic poles 84 to concentrate the magnetic flux. Both devices 80 and 70, however, are designed to treat static sample fluid and may thus have limited throughput.

FIG. 5A illustrates a conventional magnetic separator device 90 that separates the magnetically labeled cells 76 as the sample fluid flows through the device 90. The device 90 includes a conduit or column 92 disposed between a pair of permanent magnets 94 that generate a magnetic field 96 across the column 92. The column 92 is filled with a porous aggregate of ferromagnetic or ferrimagnetic particles or spheres 98 that are magnetized by the magnetic field 96 and produce relatively strong localized magnetic field and field gradient in small gaps between the particles or spheres 98, thereby attracting the magnetically labeled cells 76 to the surface of the particles or spheres 98. Compared with the magnetic beads attached to the magnetically labeled cells 76, the ferromagnetic or ferrimagnetic particles or spheres 98 are much larger and may produce remanent magnetization after the permanent magnets 94 are removed from the column 92. The remanent magnetization would prevent or hinder the detachment of the magnetically labeled cells 76 from the surface of the particles or spheres 98 after the separation process. While the magnetic separator device 90 may operate in a continuous flow manner and thus may have a higher throughput than the magnetic separators 70 and 80 that operate in a static manner, the recovery of the magnetically labeled cells in certain applications (e.g., positive selection process where the magnetically labeled cells are the target cells) may be lower without vigorously flushing the column 92 to dislodge the magnetically labeled cells 76 from the surface of the particles or spheres 98.

The porous aggregate of soft magnetic particles or spheres 98 in the column 92 may be replaced by one or more meshes 102 made of a ferromagnetic or ferrimagnetic material as shown in FIG. 5B. The magnetic separator device 100 may reduce the remanent magnetization encountered in the device 90 because the wires in mesh 102 have smaller dimensions than the ferromagnetic or ferrimagnetic particles or spheres 98. However, the larger opening between adjacent wires in the mesh 102 may also weaken the localized magnetic field, thereby decreasing the device throughput. Both column-based devices 90 and 100 may introduced unwanted contaminants into the sample fluid as it flows through the ferromagnetic or ferrimagnetic material in the column 92.

FIG. 6 shows another magnetic separator device 104, which operates in a continuous flow manner without using a column that contains a porous aggregate of ferromagnetic or ferrimagnetic material, thereby obviating the potential contamination and recovery issues. The column-free device 104 includes a conduit 106 surrounded by a radial array of ferromagnetic poles 108 that conduct magnetic flux from a plurality of permanent magnets 110 and 112. The sample fluid flows through the conduit 106 along a direction perpendicular to the figure. The magnetic separator device 104 essentially rearranges the linear array of the ferromagnetic poles 84 of the static magnetic separator device 80 in a radial manner to create a magnetic periodic field in the center of the radially arranged ferromagnetic poles 108 and permanent magnets 110 and 112. Like the static device 80 shown in FIG. 4, the corresponding magnetic field distribution generated by the device 104, as delineated by magnetic field lines 114 between the trapezoidal tips of the ferromagnetic poles 108, shows that the magnetic field is strongest between the side surfaces of adjacent trapezoidal tips, as indicated by the small spacing between the field lines 114, and much weaker above the pole tips (i.e., inside the conduit 106), as indicated by the large spacing between the field lines 114. However, unlike the wells 82 that extend into the regions between the side surfaces of two adjacent trapezoidal tips, the conduit 106 of the magnetic separator device 104 does not extend into such regions, thereby making the magnetic field in the conduit 106 considerably weaker. This is further exacerbated by the limited time exposed to the magnetic field as the sample fluid flows through the conduit 106.

For the foregoing reasons, there is a need for a magnetic separator device that can rapidly separate or sort magnetically labeled cells without introducing potential contaminants into the sample.

SUMMARY

The present invention is directed to a device that satisfies this need. A magnetic separator device having features of the present invention for sorting biological objects includes a soft magnetic center pole having a bottom end and a tapered tip end; first and second soft magnetic side poles disposed on opposite sides of the soft magnetic center pole and respectively having first and second bottom ends, the first and second soft magnetic side poles respectively having first and second top ends that bend inward toward the soft magnetic center pole with a first outward side of the first top end and a second outward side of the second top end being substantially coplanar; a magnetic flux source generating magnetic flux in the soft magnetic center pole and the first and second soft magnetic side poles; and a channel plate having a channel embedded therein and a first planar surface that is operable to be in contact with or in close proximity to the first and second outward sides. The magnetic separator device may further include a soft magnetic top shield operable to be in contact with or in close proximity to a second planar surface of the channel plate.

According to another aspect of the present invention, a magnetic separator device having features of the present invention for sorting biological objects includes a soft magnetic center pole having a bottom end and a tapered tip end; first and second soft magnetic side poles disposed on opposite sides of the soft magnetic center pole and respectively having first and second bottom ends, the first and second soft magnetic side poles respectively having first and second top ends that are substantially coplanar; a channel plate including a channel embedded therein and a first planar surface operable to be in contact with or in close proximity to the tapered tip end; a soft magnetic top shield operable to be in contact with or in close proximity to a second planar surface of the channel plate; and a magnetic flux source generating magnetic flux in the soft magnetic center pole, the first and second soft magnetic side poles, and the soft magnetic top shield.

According to still another aspect of the present invention, a magnetic separator device having features of the present invention for sorting biological objects includes a soft magnetic center pole having a bottom end and a tapered tip end; first and second soft magnetic side poles disposed on opposite sides of the soft magnetic center pole, the first soft magnetic side pole having a first bottom end and a first top end, the second soft magnetic side pole having a second bottom end and a second top end, the first and second top ends bending inward toward the soft magnetic center pole and each having a chisel edge profile with a bevel side facing outward away from the soft magnetic center pole; a magnetic flux source generating magnetic flux in the soft magnetic center pole and the first and second soft magnetic side poles; a flexible conduit nestled in a gap formed between the tapered tip end and the bevel sides of the first and second top ends; and a soft magnetic press operable to push and deform the flexible conduit nestled in the gap.

BRIEF DESCRIPTION OF THE DRAWINGS

These and other features, aspects, and advantages of the present invention will become better understood with regard to the following description, appended claims, and accompanying drawings where:

For purposes of clarity and brevity, like elements and components will bear the same designations and numbering throughout the Figures, which are not necessarily drawn to scale.

DETAILED DESCRIPTION

Figures 1A, 1B:
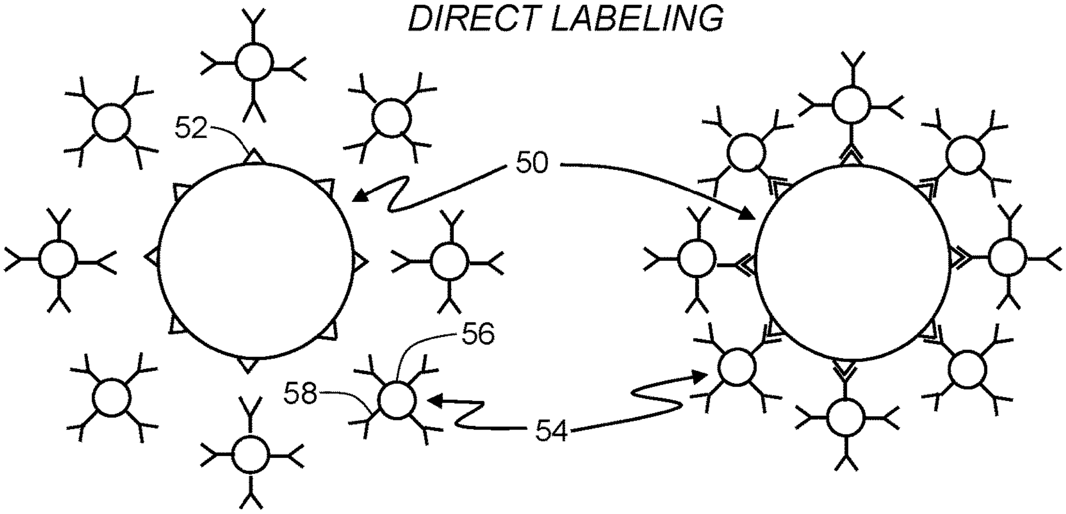
FIG. 1A (PRIOR ART) FIG. 1B (PRIOR ART)
FIGS. 1A and 1B illustrate formation of a magnetically labeled cell by direct labeling process.
Figures 2A, 2B:
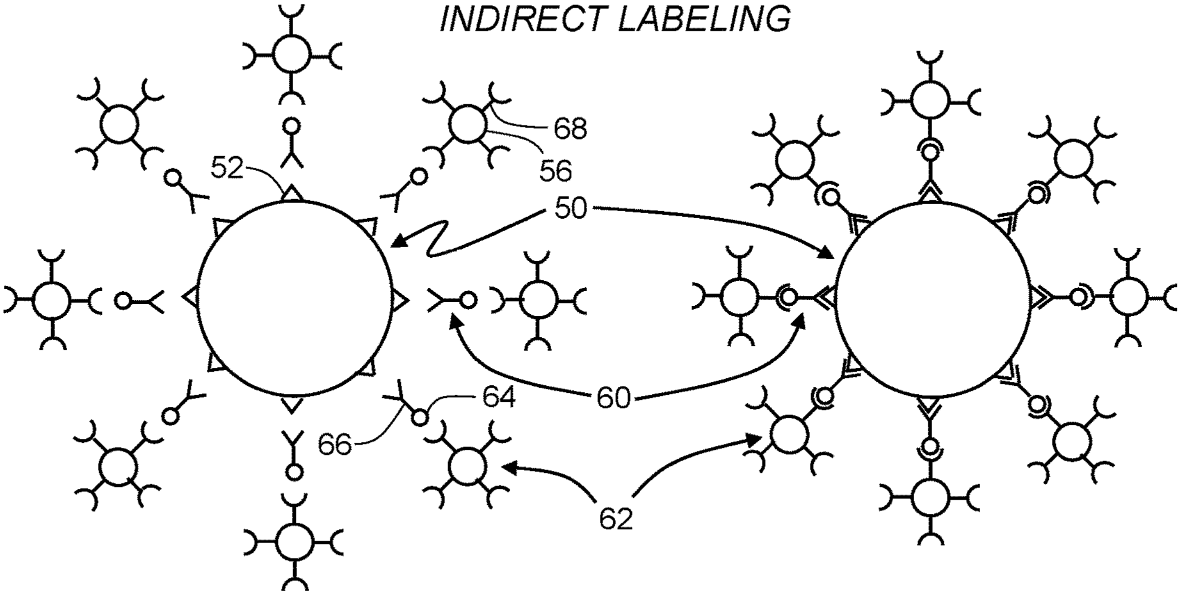
FIG. 2A (PRIOR ART) FIG. 2B (PRIOR ART)
FIGS. 2A and 2B illustrate formation of a magnetically labeled cell by indirect labeling process.
Figure 3A:
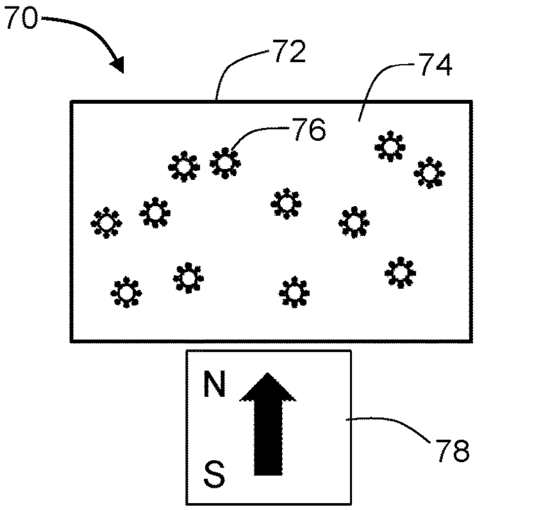
FIG. 3A (PRIOR ART)
FIGS. 3A and 3B illustrate sorting of magnetically labeled cells by a conventional static magnetic separator device.
Figure 3B:
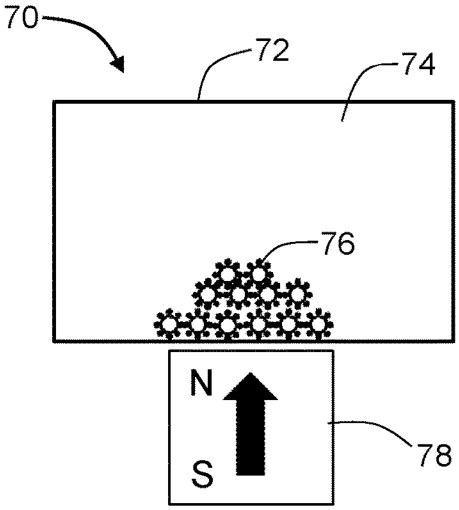
FIG. 3B (PRIOR ART)
Figure 4:
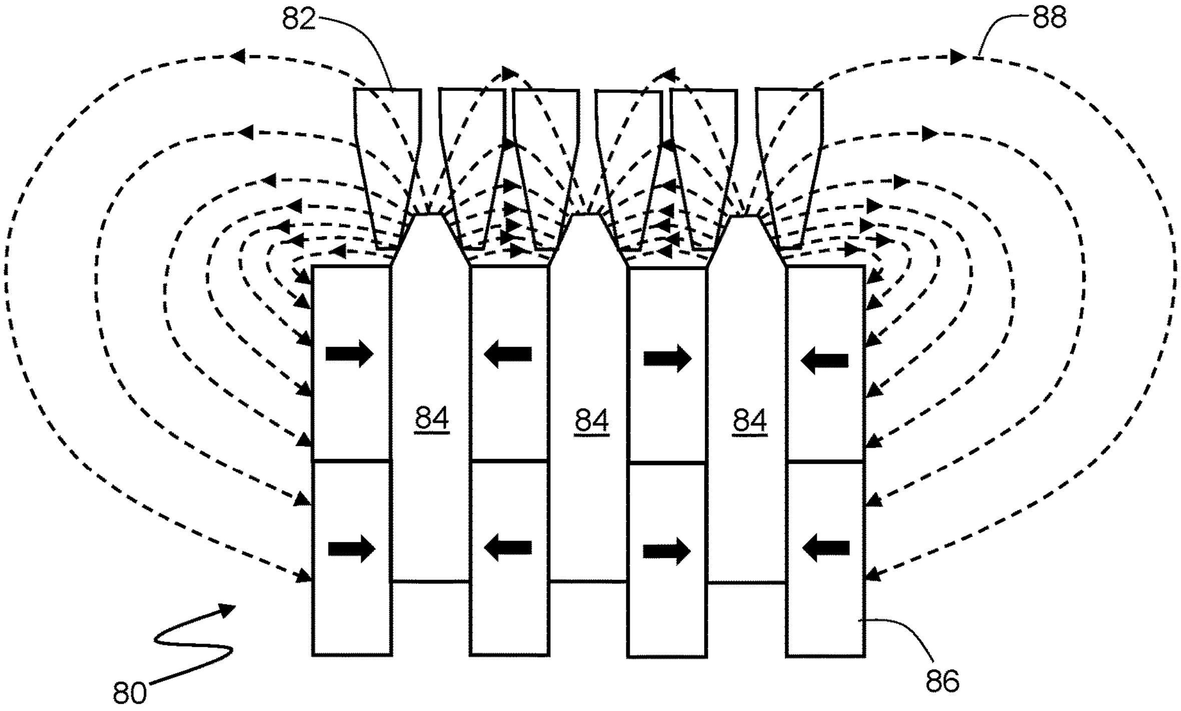
FIG. 4 (PRIOR ART)
FIG. 4 illustrates another conventional magnetic separator device for sorting magnetically labeled cells in a static sample fluid.
Figure 5A:
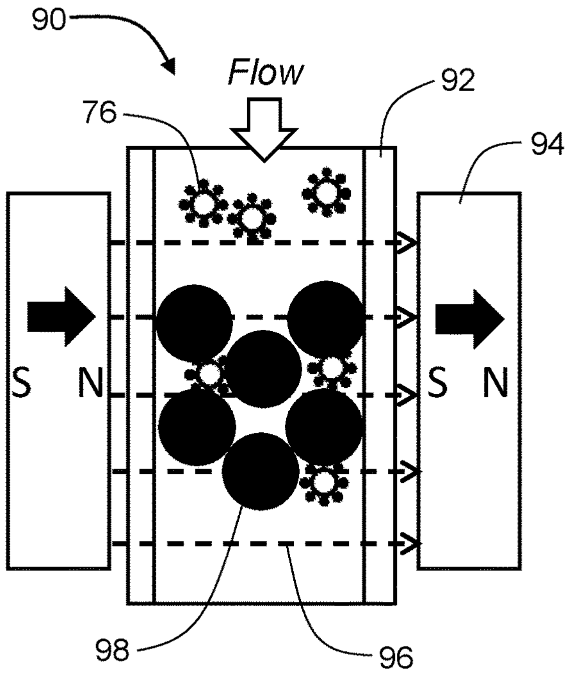
FIG. 5A (PRIOR ART)
FIGS. 5A and 5B illustrate two conventional magnetic separator devices that utilize a column filled with ferromagnetic or ferrimagnetic objects for sorting magnetically labeled cells flowing through the columns.
Figure 5B:
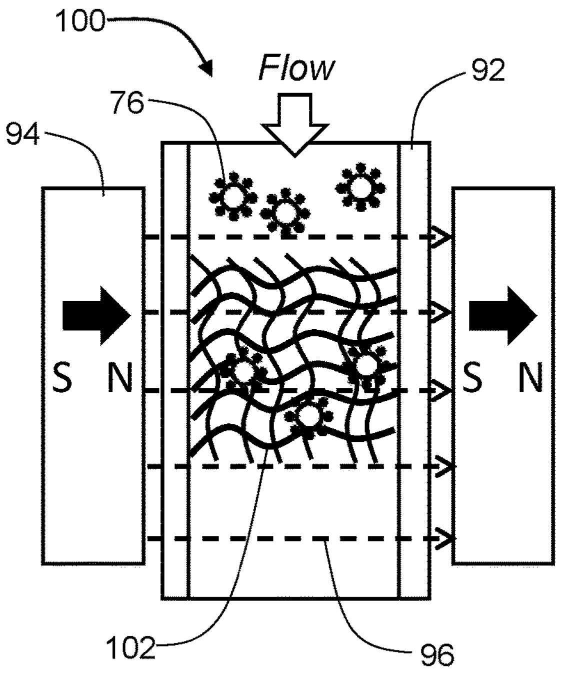
FIG. 5B (PRIOR ART)
Figure 6:
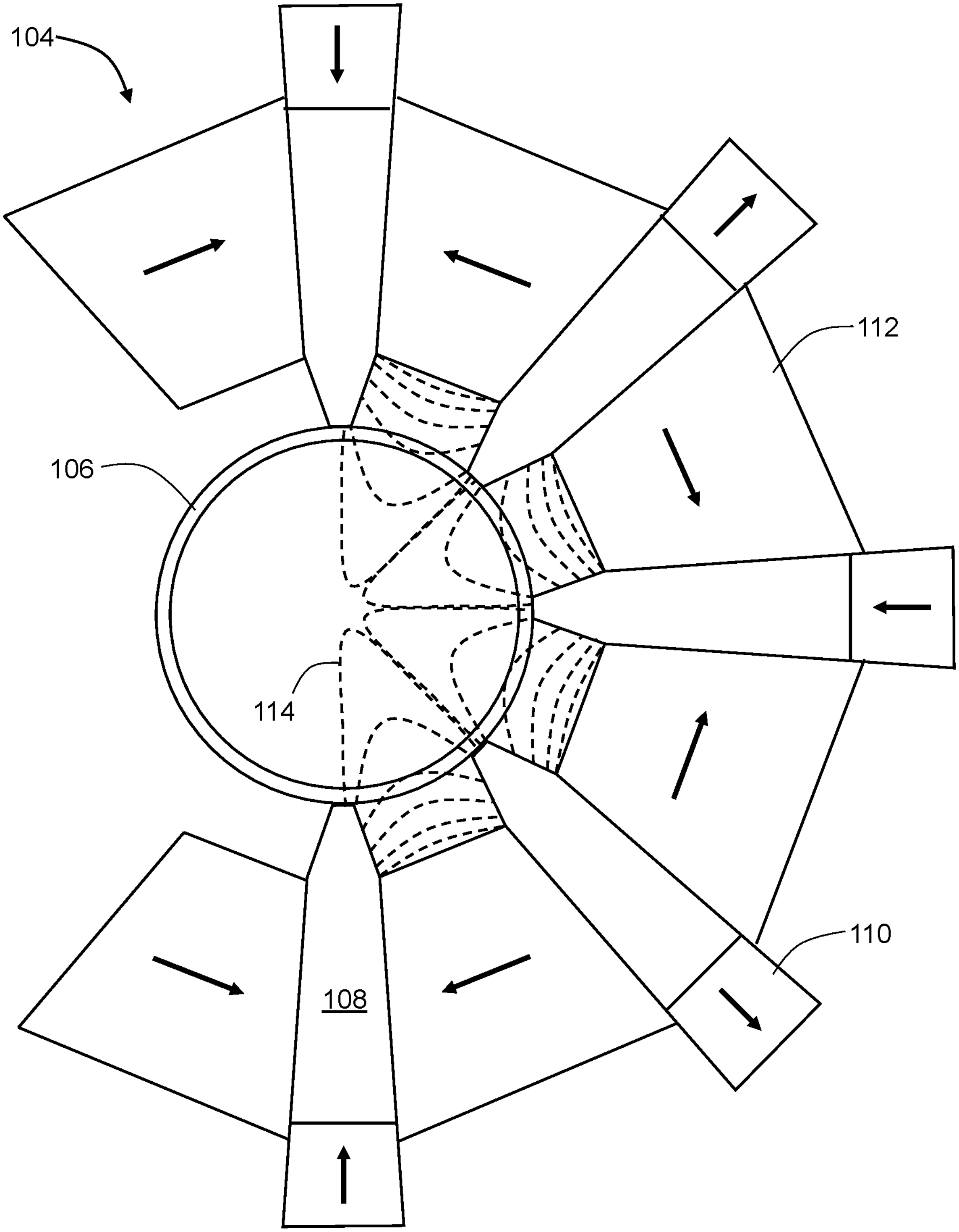
FIG. 6 (PRIOR ART)
FIG. 6 is a cross-sectional view corresponding to a magnetic separator device for sorting magnetically labeled cells flowing through a conduit.

In the Summary above and in the Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously, except where the context excludes that possibility, and the method can include one or more other steps which are carried out before any of the defined steps, between two of the defined steps, or after all the defined steps, except where the context excludes that possibility.

The term “at least” followed by a number is used herein to denote the start of a range beginning with that number, which may be a range having an upper limit or no upper limit, depending on the variable being defined. For example, “at least 1” means 1 or more than 1. The term “at most” followed by a number is used herein to denote the end of a range ending with that number, which may be a range having 1 or 0 as its lower limit, or a range having no lower limit, depending upon the variable being defined. For example, “at most 4" means 4 or less than 4, and "at most 40%" means 40% or less than 40%. When, in this specification, a range is given as "a first number to a second number" or "a first number-a second number," this means a range whose lower limit is the first number and whose upper limit is the second number. For example, "25 to 100 nm" means a range whose lower limit is 25 nm and whose upper limit is 100 nm.

The term "biological objects" may be used herein to include cells, bacteria, viruses, molecules, particles including RNA and DNA, cell cluster, bacteria cluster, molecule cluster, and particle cluster.

The term "biological sample" may be used herein to include blood, body fluid, tissue extracted from any part of the body, bone marrow, hair, nail, bone, tooth, liquid and solid from bodily discharge, or surface swab from any part of body. "Fluid sample," or "sample fluid," or "liquid sample," or "sample solution" may include a biological sample in its original liquid form, biological objects being dissolved or dispersed in a buffer liquid, or a biological sample dissociated from its original non-liquid form and dispersed in a buffer fluid. A buffer fluid is a liquid into which biological objects may be dissolved or dispersed without introducing contaminants or unwanted biological objects. Biological objects and biological sample may be obtained from human or animal. Biological objects may also be obtained from plants and environment including air, water, and soil. A fluid sample may contain various types of magnetic or optical labels, or one or more chemical reagents that may be added during various process steps.

The term "sample flow rate" or "flow rate" may be used herein to represent the volume amount of a fluid sample flowing through a cross section of a channel, or a conduit, or a fluidic part, or a fluidic path in a unit time.

The term "relative fraction" may be used herein to represent the ratio of a given quantity of biological objects or particles to the total quantity of all biological objects or particles present in a fluid sample.

In the art of cell sorting or enrichment, the target population of biological objects is referred to as the "specific" objects of interest and those biological objects that are isolated, but are not desired, are termed "non-specific." The term "purity" describes the concentration or relative fraction of target or specific biological objects of interest and is quantified by the number of target biological objects divided by the total number of biological objects expressed in percentage. The term "recovery ratio" describes the sorting efficiency of biological objects and is quantified by the number of target biological objects recovered after sorting divided by the number of target biological objects present in the initial sample expressed in percentage.

Figure 7:
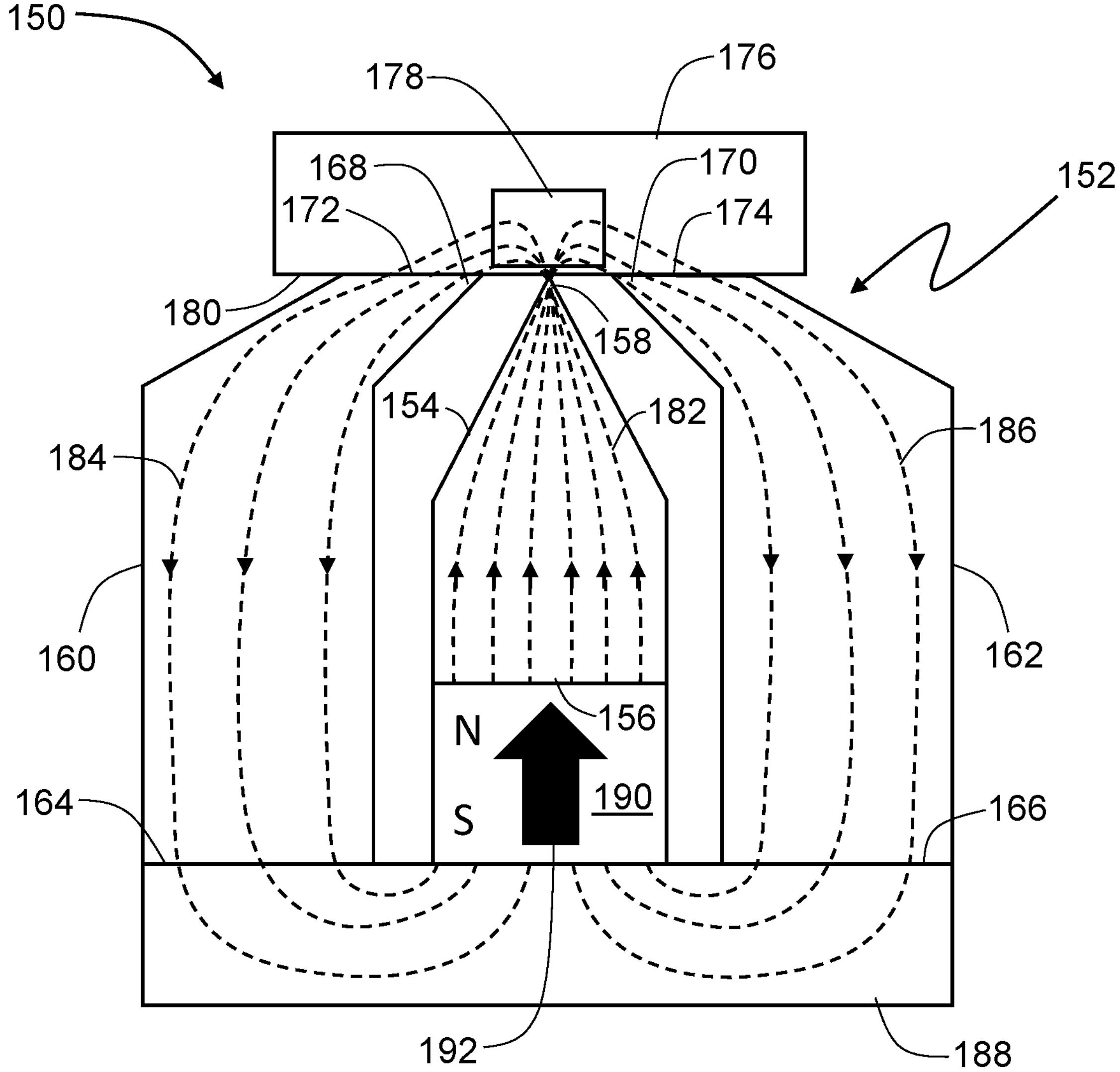
FIG. 7 is a cross-sectional view showing an embodiment of the present invention as applied to a magnetic separator device for separating or isolating magnetically labeled biological objects.

FIG. 7 is a cross-sectional view showing an embodiment of the present invention as applied to a magnetic separator device for separating or sorting biological objects. The magnetic device 150 includes a magnetic field generator 152, which comprises a soft magnetic center pole 154 having a bottom end 156 and a tapered tip end 158; a first soft magnetic side pole 160 and a second soft magnetic side pole 162 disposed on opposite sides of the soft magnetic center pole 154 and respectively having first and second bottom ends 164 and 166, the first and second soft magnetic side poles 160 and 162 respectively having first and second top ends 168 and 170 that are bent inward toward the soft magnetic center pole 154 with a first outward side 172 of the first top end 168 and a second outward side 174 of the second top end 170 being substantially coplanar; and a magnetic flux source or a means for generating magnetic flux in the soft magnetic center pole 154 and the first and second soft magnetic side poles 160 and 162. The first and second soft magnetic side poles 160 and 162 may be substantially parallel to each other at or near their respective bottom ends 164 and 166. The magnetic device 150 further includes a channel plate 176 including a channel 178 embedded therein and having a substantially flat surface 180 that is operable to be in contact with or in close proximity to (e.g., 1 mm or less) the first and second outward sides 172 and 174. The magnetic device 150 extends along a direction perpendicular to the cross section thereof.

The magnetic flux 182 is concentrated from the bottom end 156 to the tapered tip end 158 of the soft magnetic center pole 154 and is divided between the first and second top ends 168, 170. The magnetic flux forms a first flux closure 182, 184 between the soft magnetic center pole 154 and the first soft magnetic side pole 160 and a second flux closure 182, 186 between the soft magnetic center pole 154 and the second soft magnetic side pole 162.

For the embodiment shown in FIG. 7, the magnetic flux source or the means for generating magnetic flux includes a soft magnetic bottom shield 188 disposed beneath the first and second bottom ends 164 and 166, and a permanent magnet 190 disposed between the bottom end 156 of the soft magnetic center pole 154 and the soft magnetic bottom shield 188. The magnetization direction 192 of the permanent magnet 190 may be oriented in a direction parallel to the soft magnetic center pole 154. The magnetization direction 192 may alternatively be oriented in a direction opposite to that shown in FIG. 7.

With continuing reference to FIG. 7, the tapered tip end 158, which is disposed between the first and second top ends 168 and 170, may reach a surface that is coplanar with the first and second outward sides 172 and 174. The tapered tip end 158 may be equally spaced from the first and second top ends 168 and 170. The soft magnetic center pole 154 may be attached or disposed in close proximity to (e.g., 1 mm or less) the N surface of the permanent magnet 190 at the bottom end 156, which collects magnetic flux 182 from the N surface of the permanent magnet 190. The magnetic flux 182 may then be emitted from the tapered tip end 158, which is much smaller than the bottom end 156, to produce a locally high magnetic field around the tapered tip end 158 by concentrating the magnetic flux 182 conducted from the permanent magnet 190. Because of the tapered shape of the soft magnetic center pole 154 near its tip, the flux density at the tapered tip end 158 may be much higher than the flux density at the bottom end 156.

The first and second bottom ends 164 and 166 of the first and second soft magnetic side poles 160 and 162 may be attached or disposed in close proximity to (e.g., 1 mm or less) the top surface of the soft magnetic bottom shield 188. The top surface of the soft magnetic bottom shield 188 may also be attached or disposed in close proximity to (e.g., 1 mm or less) the S surface of the permanent magnet 190. Therefore, the magnetic flux 184, 186 generated from the S surface of the permanent magnet 190 is conducted through the soft magnetic bottom shield 188 and divided between the first and second soft magnetic side poles 160 and 162. The first and second top ends 168 and 170 may have smaller cross section area than the first and second bottom ends 164 and 166, respectively. The magnetic flux 184, 186 may be concentrated and emitted from the first and second top ends 168 and 170 and/or the first and second outward sides 172 and 174. The bending of the first and second top ends 168 and 170 toward the tapered tip end 158 allows the main bodies of the first and second soft magnetic side poles 160 and 162 to be disposed further apart from the main body of the soft magnetic center pole 154, thereby reducing potential magnetic flux leakage and maximizing the magnetic flux around the ends 158, 168 and 170. Since the magnetic flux 182 conducted by the soft magnetic center pole 154 has opposite direction compared to the magnetic flux 184 and 186 conducted by the first and second soft magnetic side poles 160 and 162, a part of the magnetic flux 182 will flow into the first soft magnetic side pole 160 through the space between the tapered tip end 158 and the first top end 168 and/or the first outward side 172, while another part of the magnetic flux 182 will flow into the second soft magnetic side pole 162 through the space between the tapered tip end 158 and the second top end 170 and/or the second outward side 174. Therefore, the flux generated by the permanent magnet 190 forms a first flux closure 182, 184 that circulates between the soft magnetic center pole 154, the first soft magnetic side pole 160, and the soft magnetic bottom shield 188, and a second flux closure 182, 186 that circulates between the soft magnetic center pole 154, the second soft magnetic side pole 162, and the soft magnetic bottom shield 188. Since the magnetic flux 182 conducted in the soft magnetic center pole 154 is divided between the first and second soft magnetic side poles 160 and 162, the tapered tip end 158 may have higher flux density than the first and second top ends 168, 170 or the first and second outward sides 172, 174, as indicated by the closer flux line spacing. High magnetic flux density around the tips 158, 168, and 170 would result in high magnetic field and magnetic field gradient in the vicinity around the tips 158, 168, and 170.

The soft magnetic center pole 154, the first and second soft magnetic side poles 160 and 162, and the soft magnetic bottom shield 188 may each be made of a soft magnetic material or a material with relatively high magnetic permeability that comprises any one of iron (Fe), cobalt (Co), nickel (Ni), or any combination thereof. In an embodiment, the poles 154, 160, and 162 and shield 188 are made of permalloy, which is an alloy comprising iron and nickel.

Figure 8:
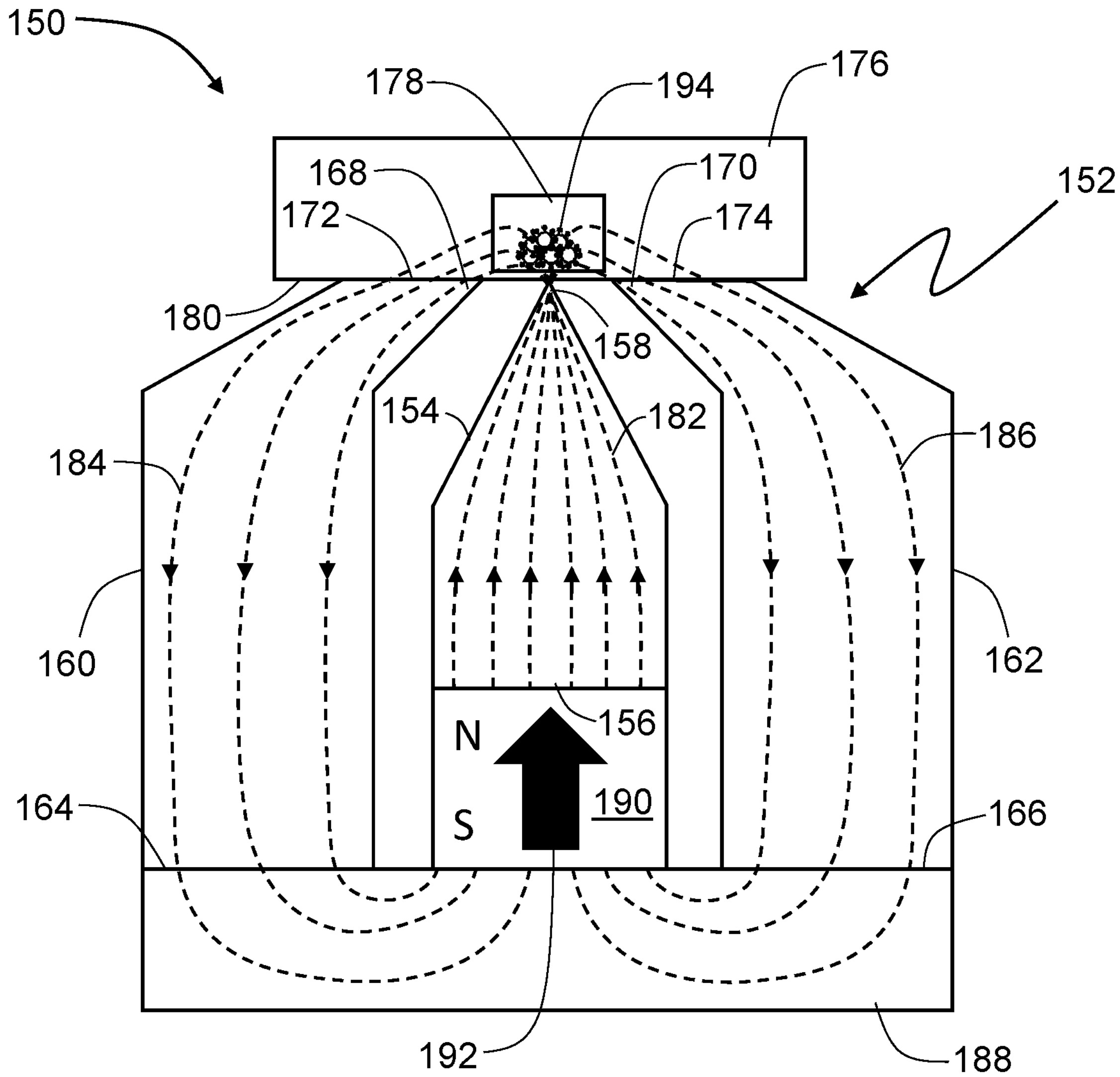
FIG. 8 is a cross-sectional view illustrating the accumulation of magnetically labeled biological objects on the channel wall of the device of FIG. 7 during a sorting operation.
Figure 9:
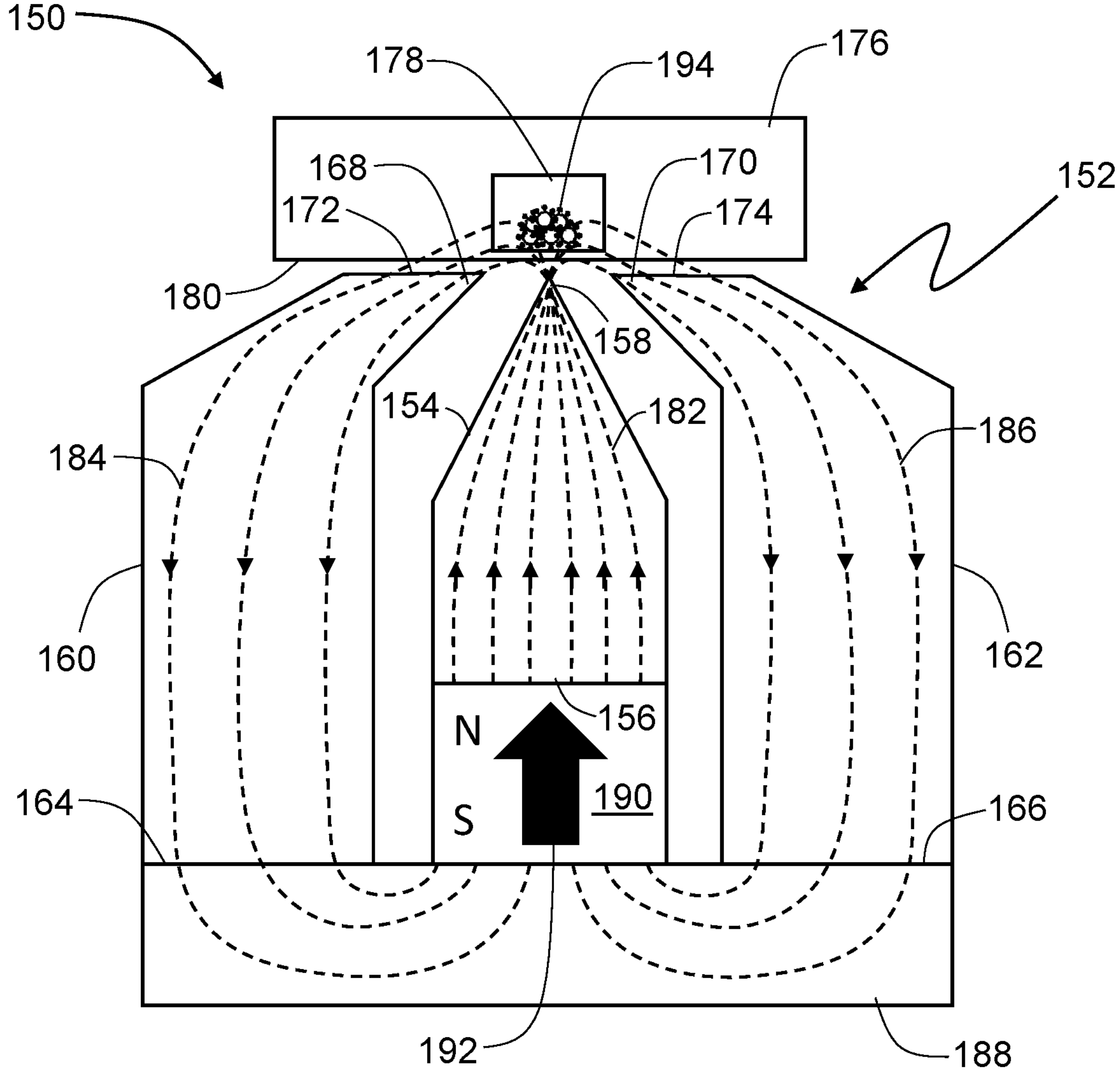
FIG. 9 is a cross-sectional view illustrating that the channel plate is positioned in close proximity to rather than in contact with the first and second outward sides of the device of FIG. 7 during a sorting operation.
Figure 10:
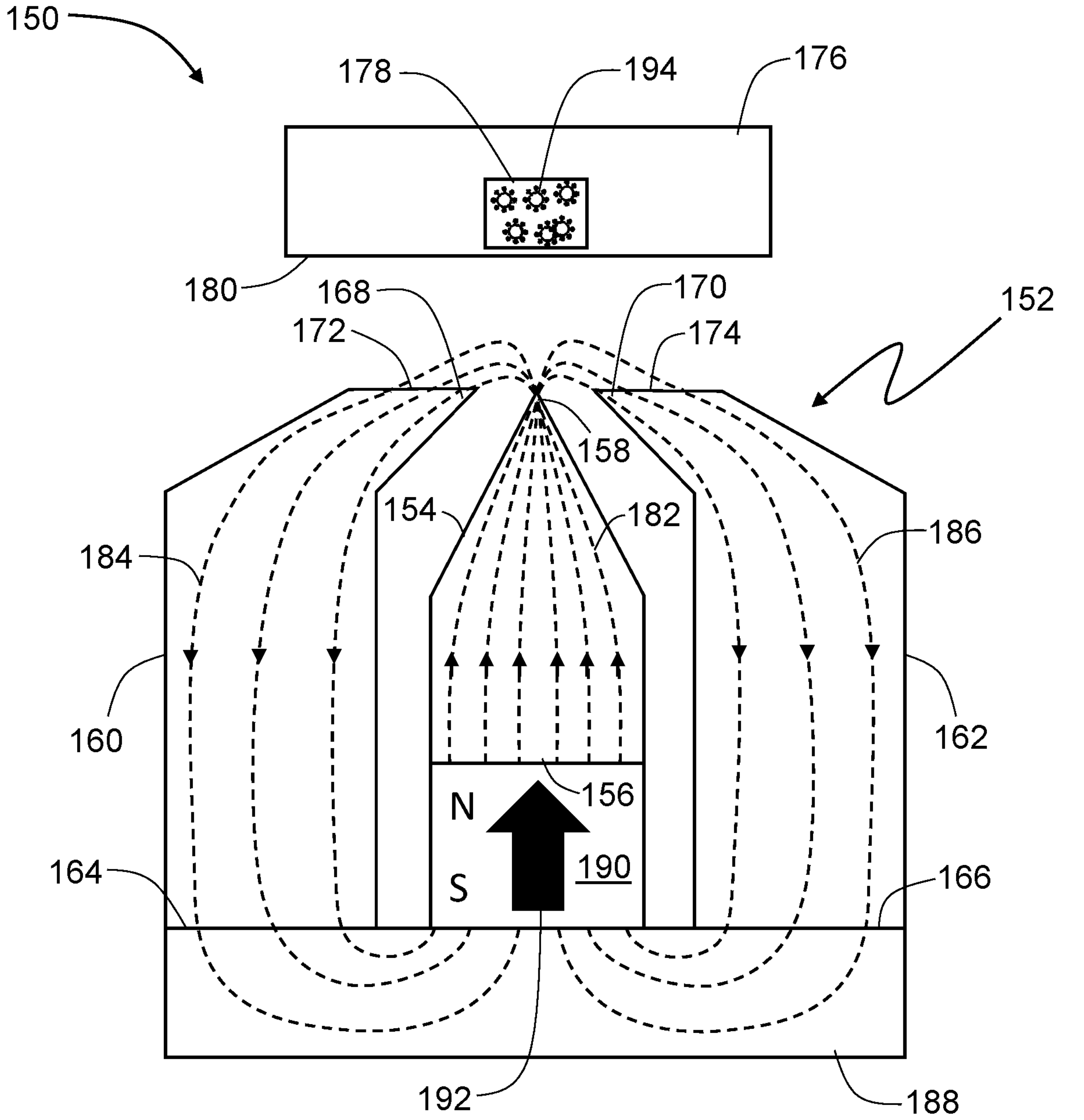
FIG. 10 is a cross-sectional view illustrating that the channel plate is removed from the magnetic field generator of the device of FIG. 7 after a sorting operation.

The center of the channel 178 in the channel plate 176 may be substantially aligned to the tapered tip end 158. The width of the channel 178 may be narrower than the gap between the first and second top ends 168, 170. The design of the poles 154, 160, and 162 and the placement of the channel 178 in close proximity to the poles 154, 160, and 162 allow high magnetic field and high magnetic field gradient to exist inside the channel 178. During a sorting operation, a fluid sample containing nonmagnetic biological objects and biological objects labeled with magnetic beads may flow through the channel 178 as shown in FIG. 8. The magnetically labeled biological objects 194 may condense or accumulate to form one or more magnetic conglomerates or aggregates on the channel walls, especially on the bottom wall where the magnetic field gradient may be particularly high owing to its proximity to the tapered tip end 158. The channel plate 176 may alternatively be positioned in close proximity to (e.g., less than 1 mm) rather than in contact with the first and second outward sides 172, 174 during the sorting operation as shown in FIG. 9. The channel plate 176 may be detached or removed from the first and second outward sides 172 and 174 to demagnetize the magnetic conglomerates after the sorting operation as shown in FIG. 10. The channel plate 176 may be fabricated from any nonmagnetic material, such as but not limited to, silicon, glass, metal, ceramic, or any combination thereof.

Figure 11:
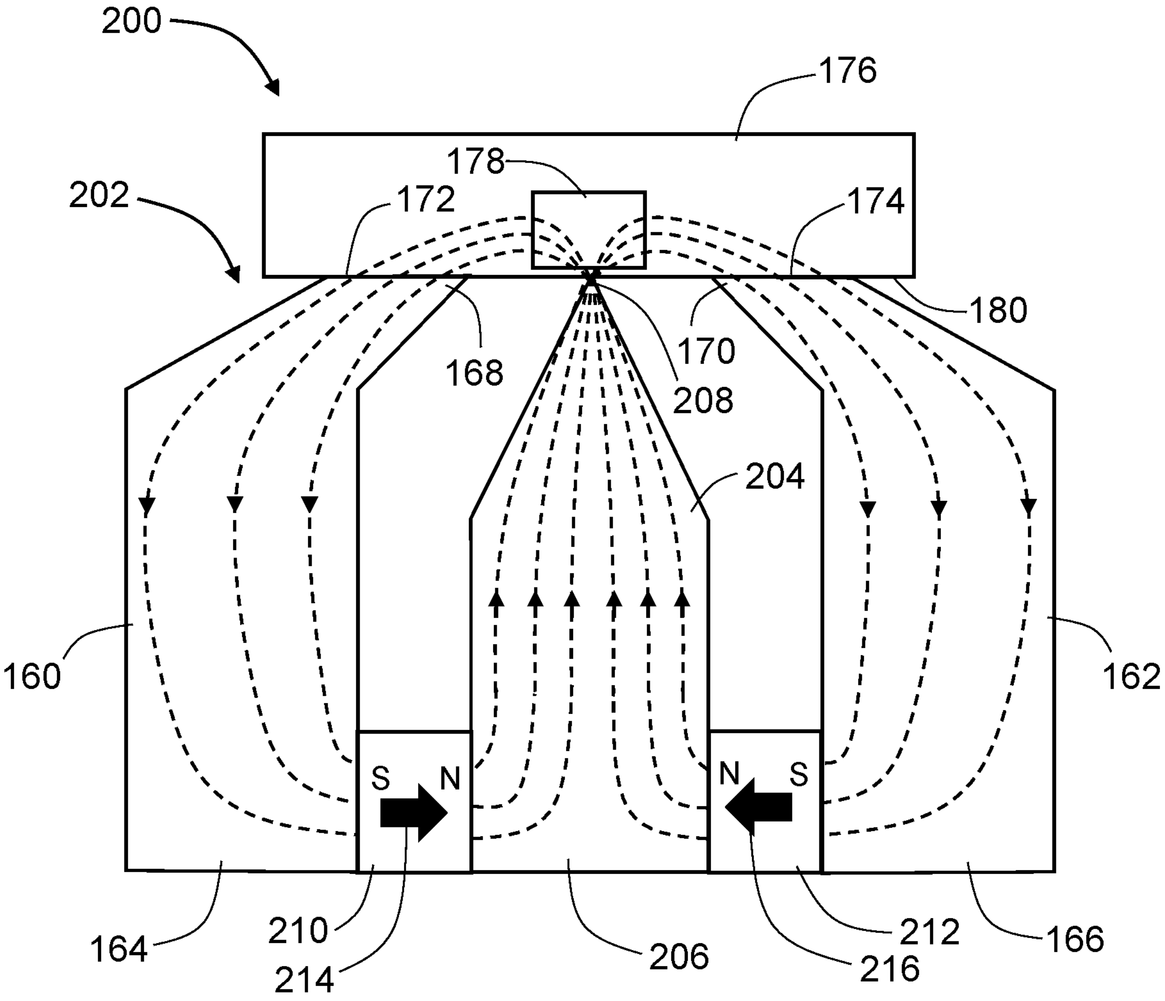
FIG. 11 is a cross-sectional view showing another embodiment of the present invention as applied to a magnetic separator device using two permanent magnets for separating or isolating magnetically labeled biological objects.

The magnetic field generator 152 shown in FIG. 7 may utilize different magnetic flux sources or means for generating magnetic flux to attain an analogous flux distribution in the three poles 154, 160, and 162. For example, FIG. 11 is a cross-sectional view of another magnetic device 200 for separating or sorting magnetized biological objects from nonmagnetic biological objects in a fluid sample. The magnetic device 200 has a magnetic field generator 202 that is analogous to the magnetic field generator 152 except for the magnetic flux source or the means for generating the magnetic flux. Like the magnetic field generator 152, the magnetic field generator 202 also includes a soft magnetic center pole 204 having a bottom end 206 and a tapered tip end 208; a first soft magnetic side pole 160 and a second soft magnetic side pole 162 disposed on opposite sides of the soft magnetic center pole 204 and respectively having first and second bottom ends 164 and 166, the first and second soft magnetic side poles 160 and 162 respectively having first and second top ends 168 and 170 that are bent inward toward the soft magnetic center pole 204 with a first outward side 172 of the first top end 168 and a second outward side 174 of the second top end 170 being substantially coplanar; and a magnetic flux source or a means for generating magnetic flux in the soft magnetic center pole 204 and the first and second soft magnetic side poles 160 and 162. The first and second soft magnetic side poles 160 and 162 may be substantially parallel to each other at or near their respective bottom ends 164 and 166. The magnetic device 200 further includes a channel plate 176 having a channel 178 embedded therein and having a substantially flat surface 180 that is operable to be in contact with or in close proximity to (e.g., 1 mm or less) the first and second outward sides 172 and 174. The magnetic device 200 extends along a direction perpendicular to the cross section thereof.

The magnetic flux source or the means for generating the magnetic flux includes a first permanent magnet 210 disposed between the first soft magnetic side pole 160 and the soft magnetic center pole 204 and a second permanent magnet 212 disposed between the second soft magnetic side pole 162 and the soft magnetic center pole 204. The first and second permanent magnets 210 and 212 have opposite magnetization directions 214 and 216 that are oriented substantially perpendicular to the soft magnetic center pole 204. The N faces of the permanent magnets 210 and 212 may be disposed adjacent to the soft magnetic center pole 204 as shown in FIG. 11. Alternatively, the S faces of the permanent magnets 210 and 212 may be disposed adjacent to the soft magnetic center pole 204 (not shown). Both configurations would generate magnetic flux that is concentrated from the bottom end 206 to the tapered tip end 208 of the soft magnetic center pole 204 and is divided between the first and second top ends 168, 170. The magnetic flux forms a first flux closure between the soft magnetic center pole 204 and the first soft magnetic side pole 160 and a second flux closure between the soft magnetic center pole 204 and the second soft magnetic side pole 162.

Figure 12:
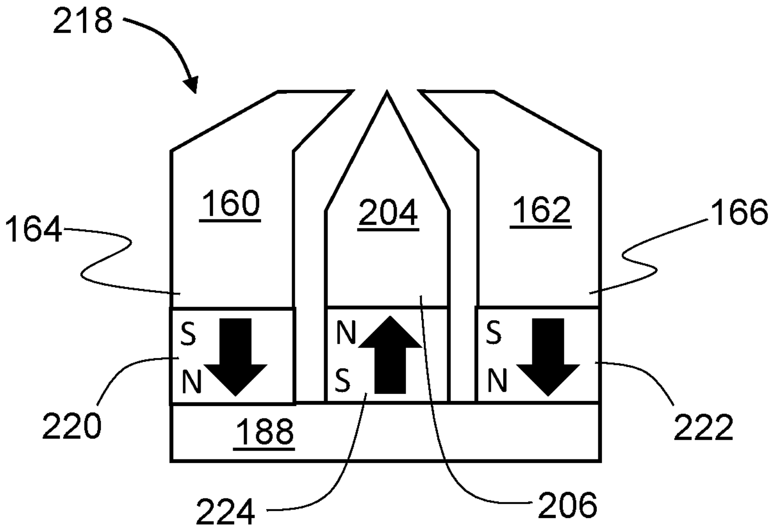
FIG. 12 is a cross-sectional view showing still another embodiment of the present invention as applied to a magnetic separator device using three permanent magnets for separating or isolating magnetically labeled biological objects.
Figure 13:
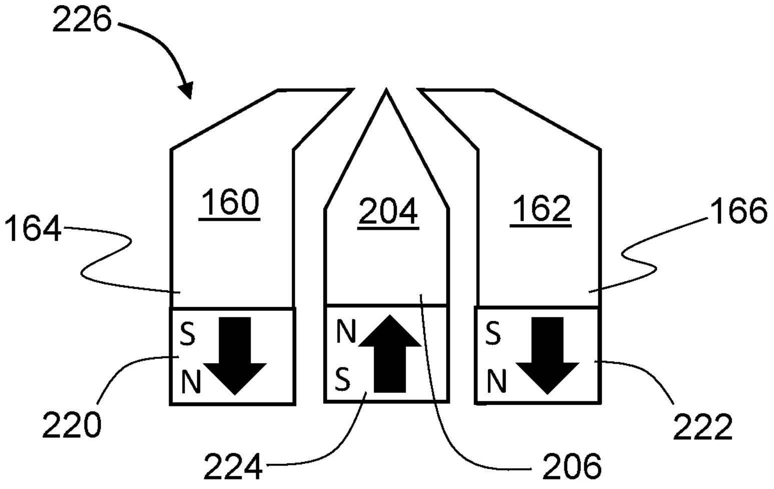
FIG. 13 is a cross-sectional view showing yet another embodiment of the present invention as applied to a magnetic separator device using three permanent magnets for separating or isolating magnetically labeled biological objects.

Further examples of the magnetic flux source or the means for generating the magnetic flux including three permanent magnets are shown in FIGS. 12 and 13, respectively. FIG. 12 is a cross-sectional view of a magnetic field generator 218 having the magnetic flux source or the means for generating the magnetic flux that includes a soft magnetic bottom shield 188, a first permanent magnet 220 disposed between a first bottom end 164 of a first soft magnetic side pole 160 and the soft magnetic bottom shield 188, a second permanent magnet 222 disposed between a second bottom end 166 of a second soft magnetic side pole 162 and the soft magnetic bottom shield 188, and a third permanent magnet 224 disposed between a bottom end 206 of a soft magnetic center pole 204 and the soft magnetic bottom shield 188. The magnetization direction the third permanent magnet 224 may be substantially parallel to the soft magnetic center pole 204 and is substantially opposite to magnetization directions of the first and second permanent magnets 220, 224. The magnetization directions of the three permanent magnets 220-224 may alternatively be oriented in directions opposite to those shown in FIG. 12.

FIG. 13 is a cross-sectional view of a magnetic field generator 226 having the magnetic flux source or the means for generating the magnetic flux that includes the first permanent magnet 220 disposed beneath a first bottom end 164 of a first soft magnetic side pole 160, a second permanent magnet 222 disposed beneath a second bottom end 166 of a second soft magnetic side pole 162, and a third permanent magnet 224 disposed beneath a bottom end 206 of a soft magnetic center pole 204. The magnetization direction of the third permanent magnet 224 may be substantially parallel to the soft magnetic center pole 204 and is substantially opposite to magnetization directions of the first and second permanent magnets 220, 222. The magnetization directions of the three permanent magnets 220-224 may alternatively be oriented in directions opposite to those shown in FIG. 13. The magnetic flux source for the magnetic field generator 226 is analogous to that of the magnetic field generator 218 shown in FIG. 12 except for the lack of the soft magnetic bottom shield 188.

Despite having different magnetic flux sources, each of the magnetic field generators 152, 202, 218, and 226 may generate magnetic flux in the soft magnetic center pole 154 or 204 that is divided between the first and second soft magnetic side poles 160 and 162, thereby forming a first flux closure between the soft magnetic center pole 154 or 204 and the first soft magnetic side pole 160 and a second flux closure between the soft magnetic center pole 154 or 204 and the second soft magnetic side pole 162.

Figure 14:
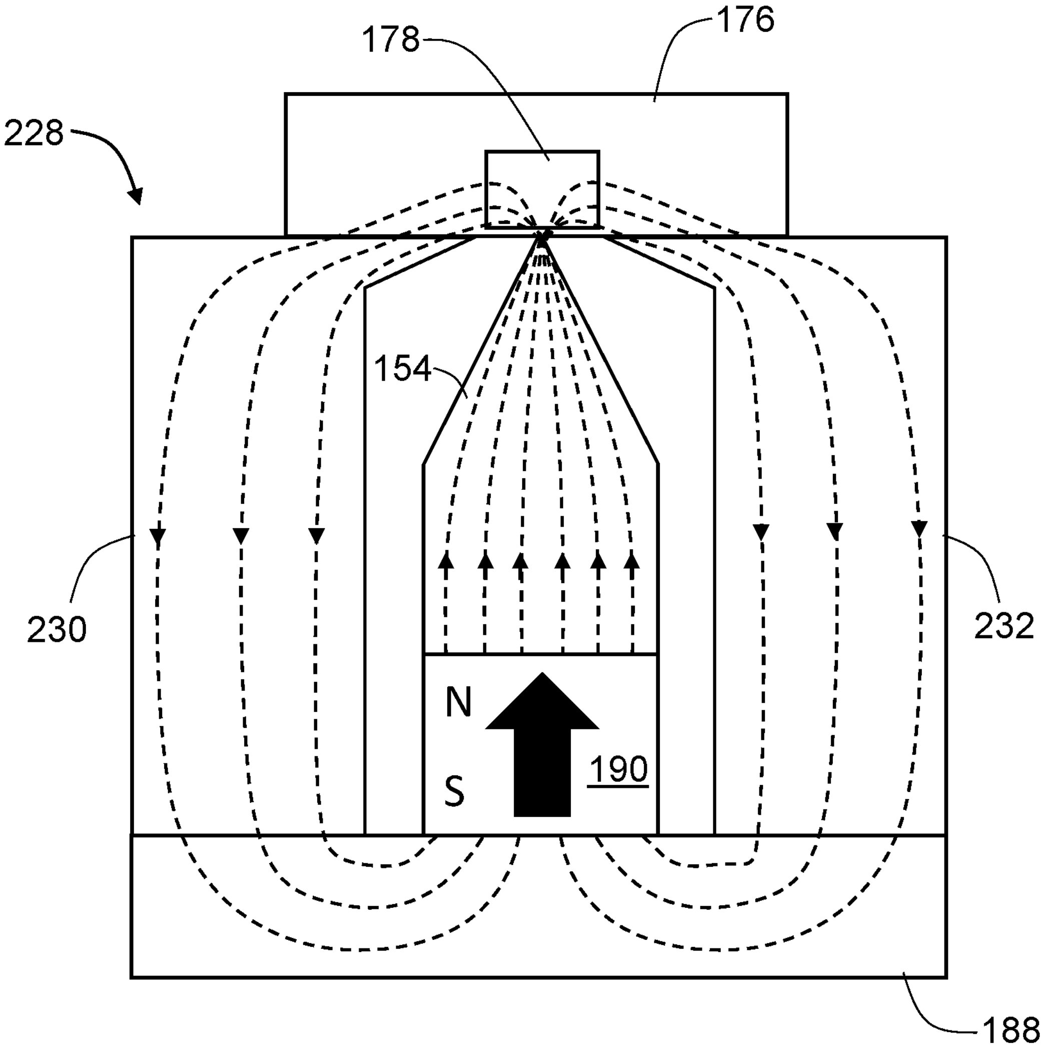
FIG. 14 is a cross-sectional view showing still yet another embodiment of the present invention as applied to a magnetic separator device for separating or isolating magnetically labeled biological objects.

The magnetic field generators 152, 202, 218, and 226, as shown in FIGS. 7-13, may utilize different pole shapes to generate the magnetic flux distribution analogous to that shown in FIG. 7. For example, FIG. 14 is a cross-sectional view showing a magnetic field generator 228 that is analogous to the magnetic field generator 152 except for the shape of the first and second soft magnetic side poles 230 and 232, the tips of which kink inward toward the soft magnetic center pole 154 rather than gradually curled inward.

Figure 15:
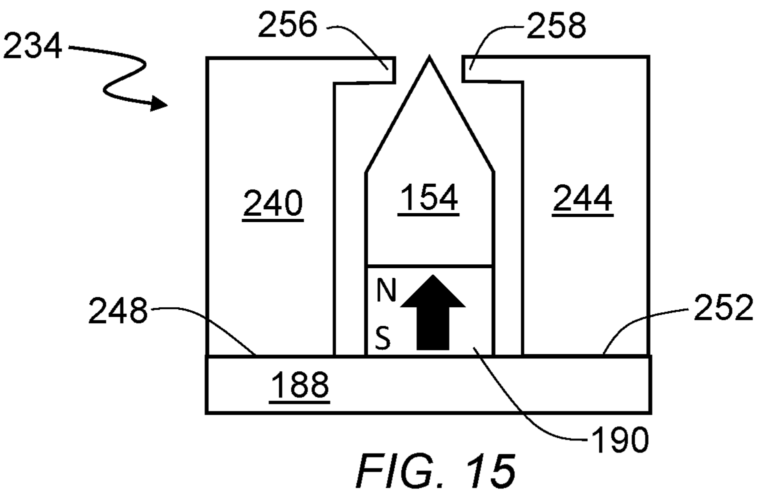
FIGS. 15-17 are cross-sectional views of magnetic field generators with different pole tip configurations.
Figure 16:
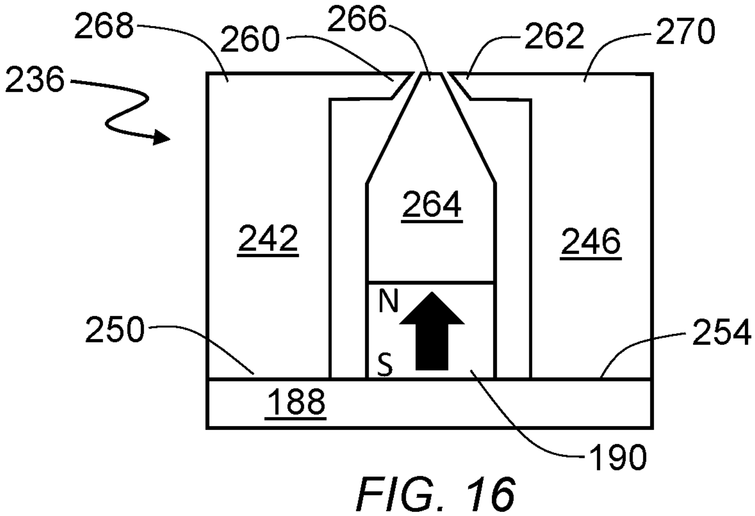
Figure 17:
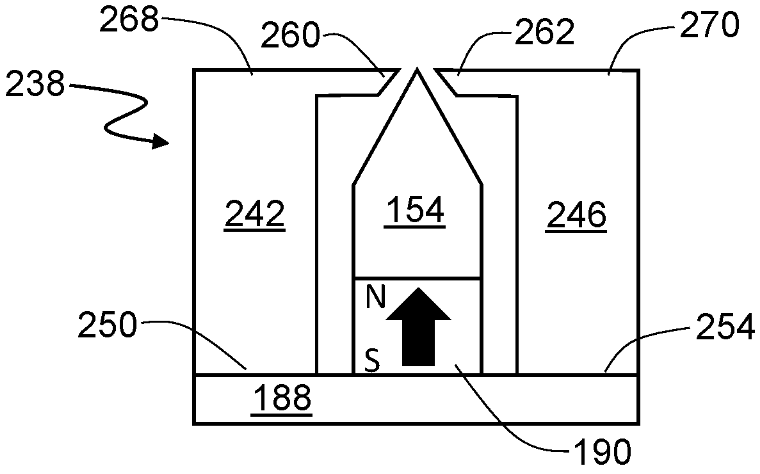

FIGS. 15-17 further show other tip shapes that may be utilized with the magnetic field generators 152, 202, 218, and 226. Like the magnetic field generator 228, the magnetic field generators 234-238 have first soft magnetic side poles 240/242 and second soft magnetic side poles 244/246 that kink inward near their top ends. For each of the magnetic field generators 234-238, the portion of the first soft magnetic side pole 240/242 between the top end and the kink, which is horizontal and is perpendicular to the main body of the pole 240/242, may have a constant width that is substantially narrower than the width at the corresponding first bottom end 248/250. Similarly, the portion of the second soft magnetic side pole 244/246 between the top end and the kink may have a constant width that is substantially narrower than the width at the corresponding second bottom end 252/254. Additionally, the top ends 256, 258 of the first and second soft magnetic side poles 240 and 244 of the magnetic field generator 234 shown in FIG. 15 may have a blunt shape. The top ends 260, 262 of the first and second soft magnetic side poles 242 and 246 of the magnetic field generators 236 and 238 shown in FIGS. 16 and 17 may have a chisel edge profile with the bevel side facing inward or an edge of the tapered tip end of the soft magnetic center pole 154/264. Furthermore, FIG. 16 shows the tapered tip end 266 of the soft magnetic center pole 264 may be blunt or flat and is substantially coplanar with the first and second outward sides 268, 270 of the first and second soft magnetic side poles 242 and 246. Any of the pole shapes and geometries shown in FIGS. 7 and 14-17 may be combined with any of the magnetic flux sources shown in FIGS. 7-14 to form a magnetic field generator that may generate the desired magnetic flux/field distribution shown in FIGS. 7-11 and 14.

Figure 18:
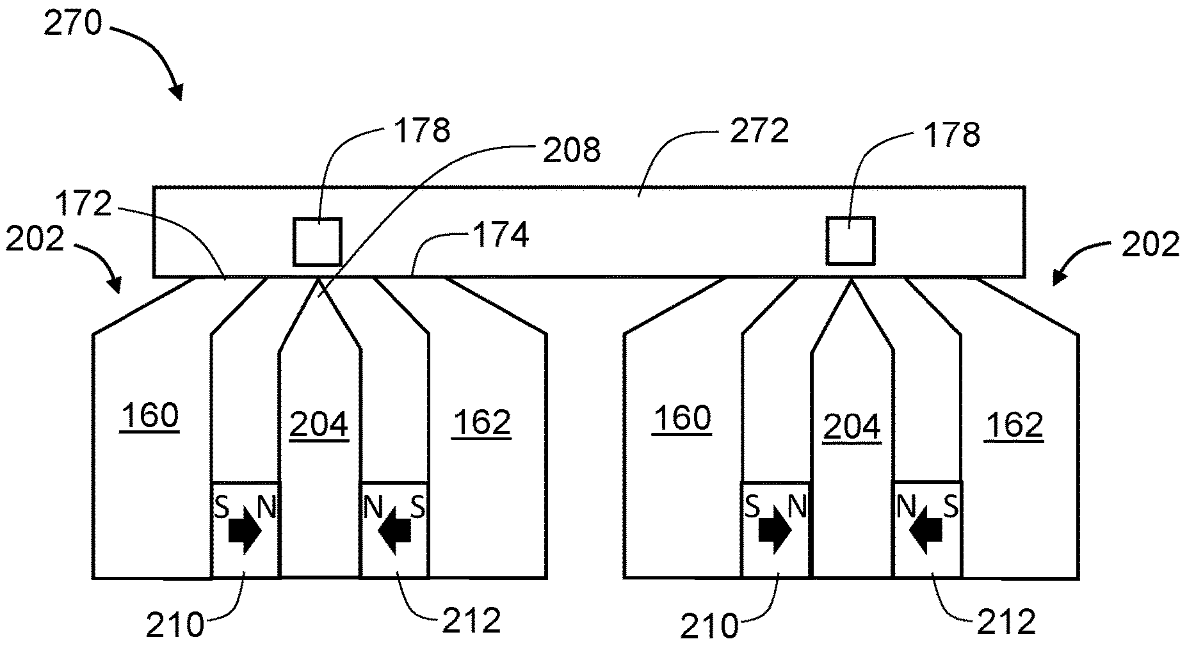
FIG. 18 is a cross-sectional view of a magnetic separator device having a channel plate with two channels and two magnetic field generators operated in parallel.

Two or more of the magnetic field generators 152, 202, 218, 226, 228, and 236-238 or any combination thereof may operate in parallel together to increase the throughput. FIG. 18 shows a magnetic device 270 including an array of two magnetic field generators 202 and a channel plate 272 including therein two channels 178 instead of two separate plates 176, each of which has one channel 178. The channel plate 272 with two channels 178 is operable to be in contact with or in close proximity to (e.g., 1 mm or less) to the first and second outward sides 172 and 174. The center of each of the channels 178 of the channel plate 272 may be substantially aligned to the respective tapered tip end 208 of the soft magnetic center pole 204, thereby maximizing the magnetic field and field gradient in the channel 178.

Figure 19:
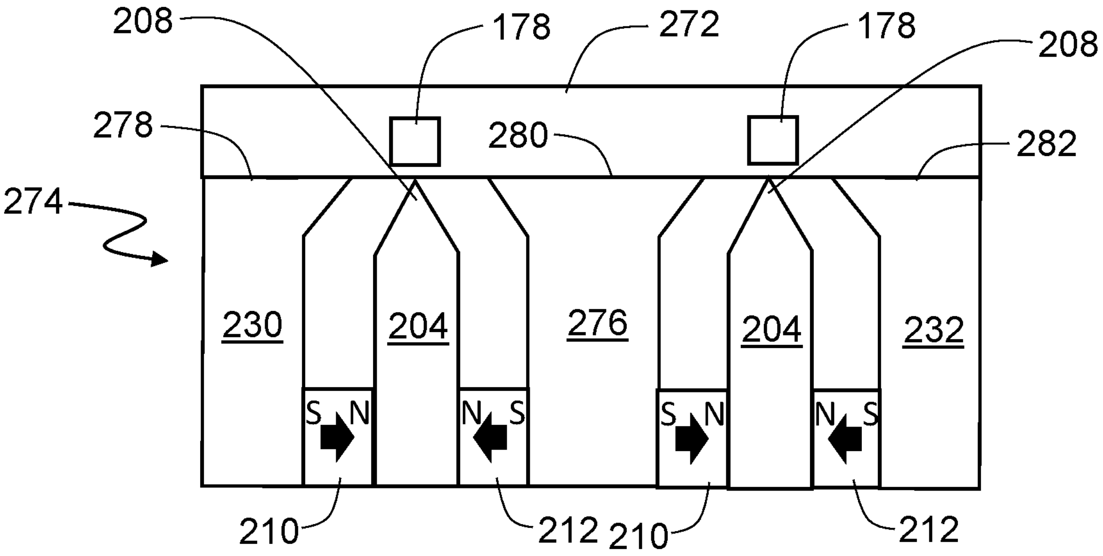
FIG. 19 is a cross-sectional view of a magnetic separator device having a channel plate with two channels and an integrated magnetic field generator.
Figure 20:
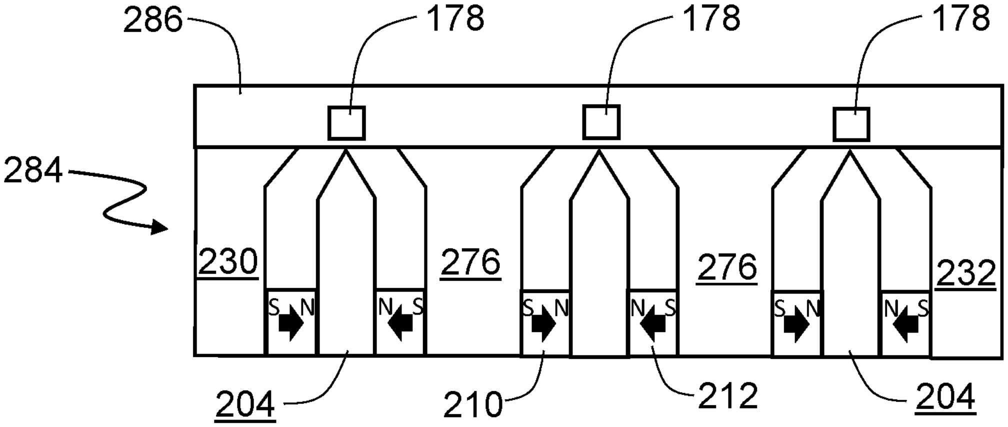
FIG. 20 is a cross-sectional view of a magnetic separator device having a channel plate with three channels and an integrated magnetic field generator.

The soft magnetic side poles of adjacent magnetic devices may also be combined or integrated to save space when multiple magnetic field generators are deployed. FIG. 19 shows an integrated magnetic field generator 274 including two magnetic field generators, each of which has the magnetic flux source of the magnetic field generator 202 and the side pole shape of the magnetic field generator 228. The two adjacent side poles, the right side-pole of the left device and the left side-pole of the right device, may be combined to form a single pole 276 with two top ends, with the left top end conducts flux from the generator of the left device and the right top end conducts flux from the generator of the right device. The channel plate 272 with two channels 178 is operable to be in contact with or in close proximity to (e.g., 1 mm or less) to the outward sides 278-282 of the poles 230, 232, and 276 of the integrated magnetic field generator 274. The center of each the channels 178 of the channel plate 272 may be substantially aligned to the respective tapered tip end 208 of the soft magnetic center pole 204, thereby maximizing the magnetic field and field gradient in the channel 178. The principle for integrating multiple magnetic devices as described above may be applied to an array of three or more magnetic field generators as shown in FIG. 20.

Figure 21:
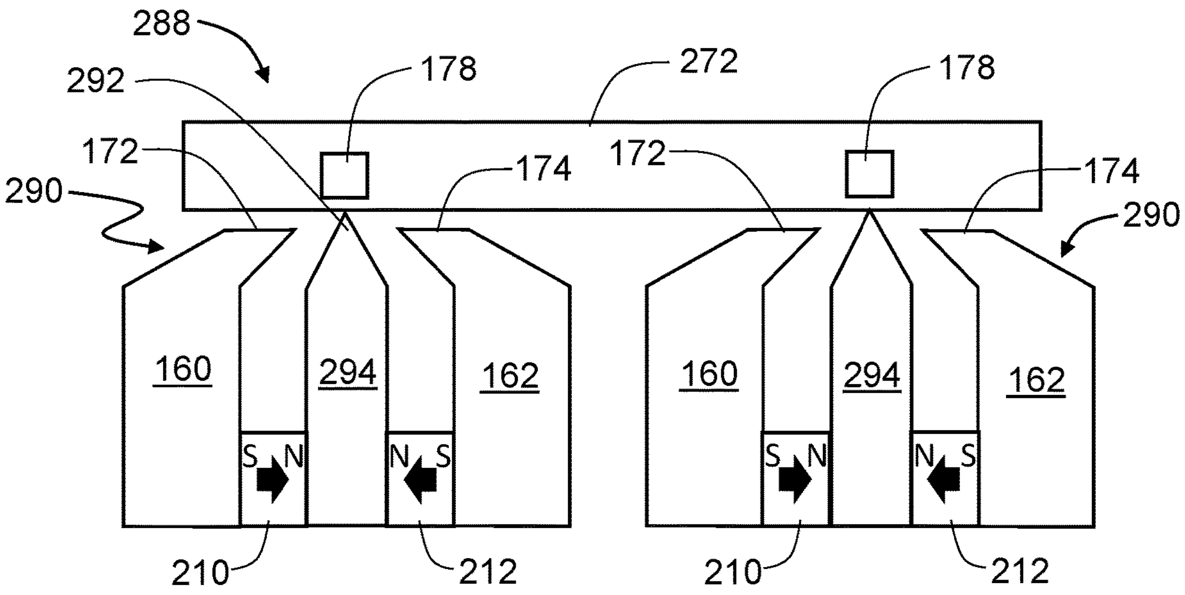
FIG. 21 is a cross-sectional view of a magnetic separator device having a channel plate with two channels and two magnetic field generators operated in parallel.

FIG. 21 shows a magnetic device 288 including an array of two magnetic field generators 290 and a channel plate 272 including therein two channels 178. The magnetic field generator 290 is similar to the magnetic field generator 202 shown in FIGS. 11 and 18 except that the tapered tip end 292 of its soft magnetic center pole 294 protrudes above the first and second outward sides 172, 174 of the first and second soft magnetic side poles 160 and 162. The channel plate 272 with two channels 178 is operable to be in contact with or in close proximity to (e.g., 1 mm or less) the tapered tip ends 292 of the soft magnetic center poles 294. The center of each of the channels 178 of the channel plate 272 may be substantially aligned to the respective tapered tip end 292 of the soft magnetic center pole 294, thereby maximizing the magnetic field and field gradient in the channel 178. The protruded soft magnetic center poles 294 shown in FIG. 21 may be combined with any of the side pole shape geometry shown in FIGS. 7 and 14-17.

Figure 22:
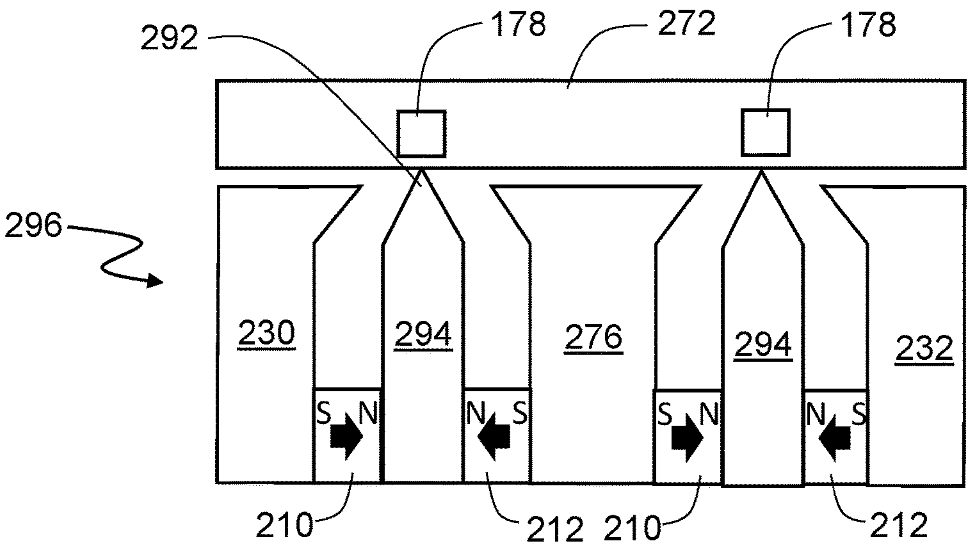
FIG. 22 is a cross-sectional view of a magnetic separator device having a channel plate with two channels and an integrated magnetic field generator.

The soft magnetic side poles 162 and 160 of two adjacent magnetic field generators 290 may also be combined or integrated to save space when multiple magnetic field generators 290 are deployed. FIG. 22 shows an integrated magnetic field generator 296 including two magnetic field generators, each of which has the magnetic flux source of the magnetic field generator 202, the side pole geometry of the magnetic field generator 274, and the center pole geometry of the magnetic field generator 290. The two adjacent side poles, the right side-pole of the left device and the left side-pole of the right device, may be combined to form a single pole 276 with two top ends, with the left top end conducts flux from the generator of the left device and the right top end conducts flux from the generator of the right device. The channel plate 272 with two channels 178 is operable to be in contact with or in close proximity to (e.g., 1 mm or less) the tapered tip ends 292 of the soft magnetic center poles 294. The center of each of the channels 178 of the channel plate 272 may be substantially aligned to the respective tapered tip end 292 of the soft magnetic center pole 294, thereby maximizing the magnetic field and field gradient in the channel 178.

Figure 23A:
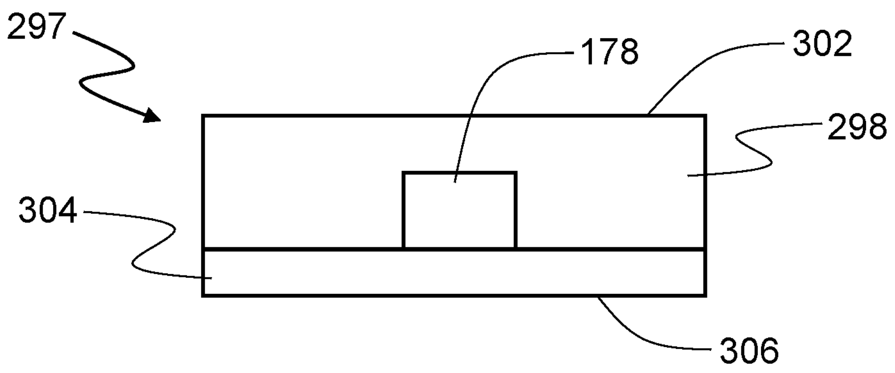
FIGS. 23A and 23B are cross-sectional views showing structure of a channel plate comprising two components.
Figure 23B:
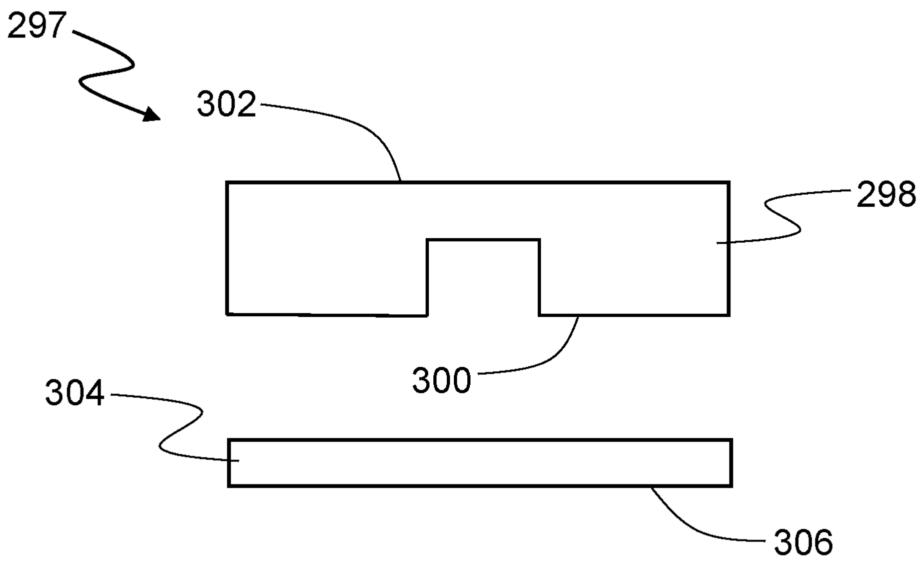

FIGS. 23A and 23B are cross-sectional views of a channel plate 297, which extends along a direction substantially perpendicular to the figure. The channel plate 297 may include a substrate 298 with a channel 178 formed in the first of two planar surfaces 300 and 302 thereof and a cover plate 304 attached or bonded to the first planar surface of the substrate 300 and covers the channel 178. An exterior surface 306 of the cover plate 304 of the channel plate 297 may face a magnetic field generator during operation. Alternatively, the second planar surface 302 of the substrate 298 of the channel plate 297 may face the magnetic field generator. The channel 178 may be formed by etching into the first planar surface 300 of the substrate 298 and may have a rectangular, semicircular, semielliptical, triangular, or other cross section shapes.

To avoid the diversion of the magnetic field away from the channel 178, the component of the channel plate 297 that faces the magnetic field generator, either the substrate 298 or the cover plate 304, may comprise a nonmagnetic material, such as but not limited to glass, polymer, silicon, silicon carbide, a ceramic material, austenitic steel, or a nonmagnetic metal. The component of the channel plate 297 that faces away from the magnetic field generator, either the substrate 298 or the cover plate 304, may also comprise a nonmagnetic material as described above, such as but not limited to glass, polymer, silicon, silicon carbide, a ceramic material, austenitic steel, or a nonmagnetic metal. Alternatively, the substrate 298 or the cover plate 306 that faces away from the magnetic field generator may comprise a soft magnetic material, such as but not limited to nickel, iron, cobalt, permalloy, steel, or any combination thereof. Furthermore, the soft magnetic material may have a laminated structure that comprises layers of a soft magnetic material interleaved with layers of a nonmagnetic material in the thickness direction of the substrate 298 or the cover plate 304. The walls of the channel 178 in the channel plate 297 may be coated or lined with a material that is inert to the sample fluid, such as but not limited to glass, polymer, ceramic, or the likes. The structure and fabrication method for the channel plate 297 with single channel 178 may also be applied to other channel plates with multiple channels (e.g., 272, 286).

Figure 24:
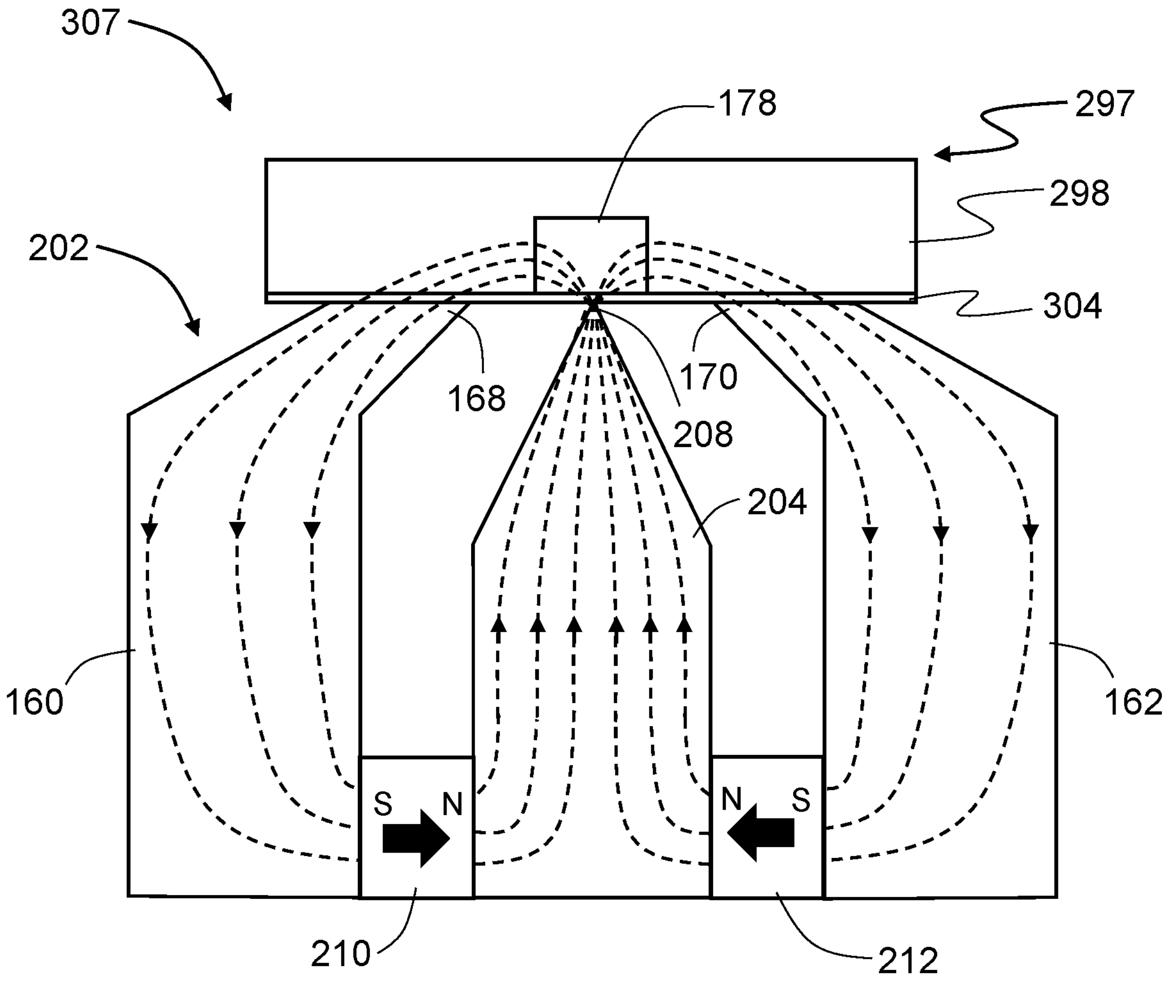
FIG. 24 is a cross-sectional view showing a magnetic separator device utilizing a channel plate with a magnetic substrate.

The use of a magnetic substrate 298 in the channel plate 297, which conducts magnetic flux from the magnetic poles and functions as a part of the magnetic field generator 202, may further strengthen the magnetic field in the channel 178 of the magnetic device 307 as shown in FIG. 24. The magnetic flux distribution in the magnetic device 307 is characterized by two flux loops. The first loop is characterized by the magnetic flux flowing from the first permanent magnet 210 to the soft magnetic center pole 204, the magnetic substrate 298 of the channel plate 297, the first soft magnetic side pole 160, and back to the first permanent magnet 210. The second loop is characterized by the magnetic flux flowing from the second permanent magnet 212 to the soft magnetic center pole 204, the magnetic substrate 298 of the channel plate 297, the second soft magnetic side pole 162, and back to the second permanent magnet 212. The magnetic flux will flow in opposite directions if the magnetization directions of the permanent magnets 210 and 212 are reversed.

Figure 25A:
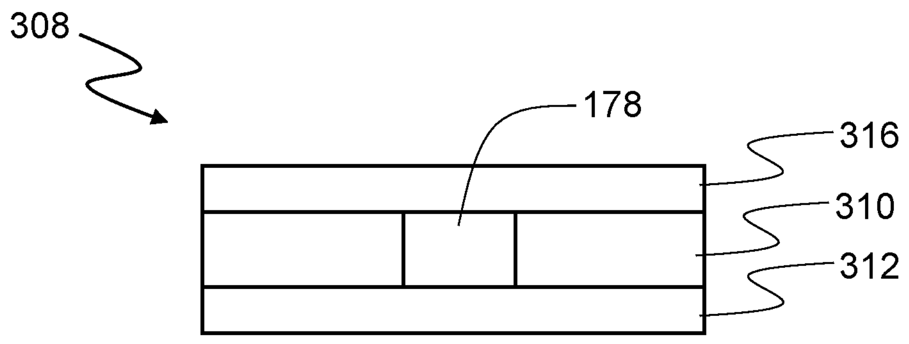
FIGS. 25A and 25B are cross-sectional views showing structure of a channel plate comprising three components.
Figure 25B:
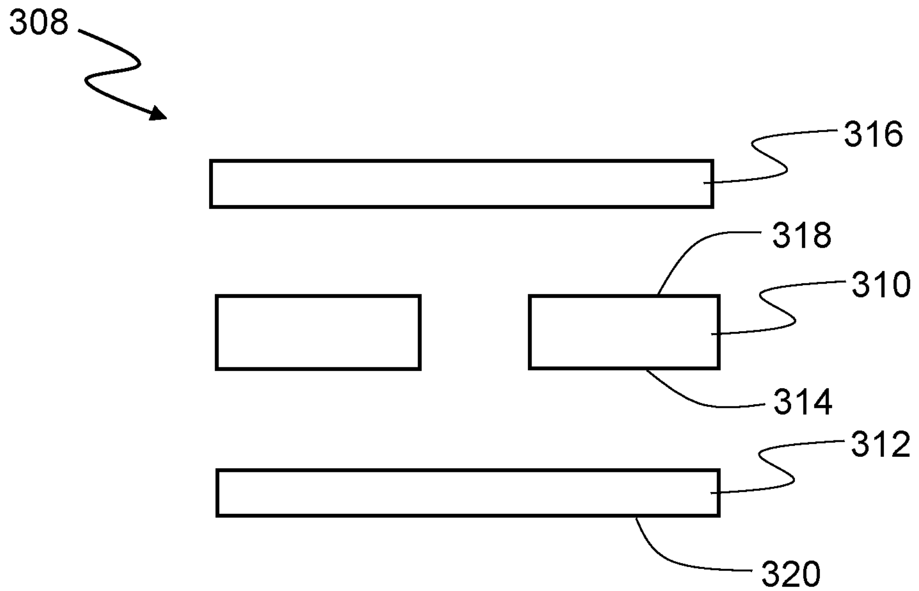

FIGS. 25A and 25 show that a channel plate 308 may alternatively comprise three components: a substrate 310 with a channel 178 formed through its thickness, a first cover plate 312 attached or bonded to a first planar surface 314 of the substrate 310 and covers the channel 178, and a second cover plate 316 attached or bonded to a second planar surface 318 of the substrate 310 and covers the channel 178. The channel 178 may be formed by etching after the substrate 310 is first bonded to the first or second cover plate 312/316. An external surface 320 of the first cover plate 312 of the channel plate 308 may face a magnetic field generator.

To avoid the diversion of the magnetic field away from the channel 178, the first cover plate 312, which faces a magnetic field generator, may comprise a nonmagnetic material, such as but not limited to glass, polymer, silicon, silicon carbide, a ceramic material, austenitic steel, or a nonmagnetic metal. The substrate 310 may comprise a nonmagnetic material as described above or a magnetic material, such as but not limited to nickel, iron, cobalt, permalloy, steel, or any combination thereof. The second cover plate 306 may comprise a nonmagnetic material or a soft magnetic material as described above. Furthermore, the soft magnetic material may have a laminated structure that comprises layers of a soft magnetic material interleaved with layers of a nonmagnetic material along the thickness direction of the substrate 310 or the second cover plate 316. In an embodiment, only the substrate 310 is made of a soft magnetic material. In another embodiment, only the second cover plate 316 is made of a soft magnetic material. In still another embodiment, the substrate 310 and the second cover plate 316 are each made of a soft magnetic material. The walls of the channel 178 in the channel plate 308 may be coated or lined with a material that is inert to the sample fluid, such as but not limited to glass, polymer, ceramic, or the likes. The structure and fabrication method for the channel plate 308 with single channel 178 may also be applied to other channel plates with multiple channels (e.g., 272, 286).

Figure 26:
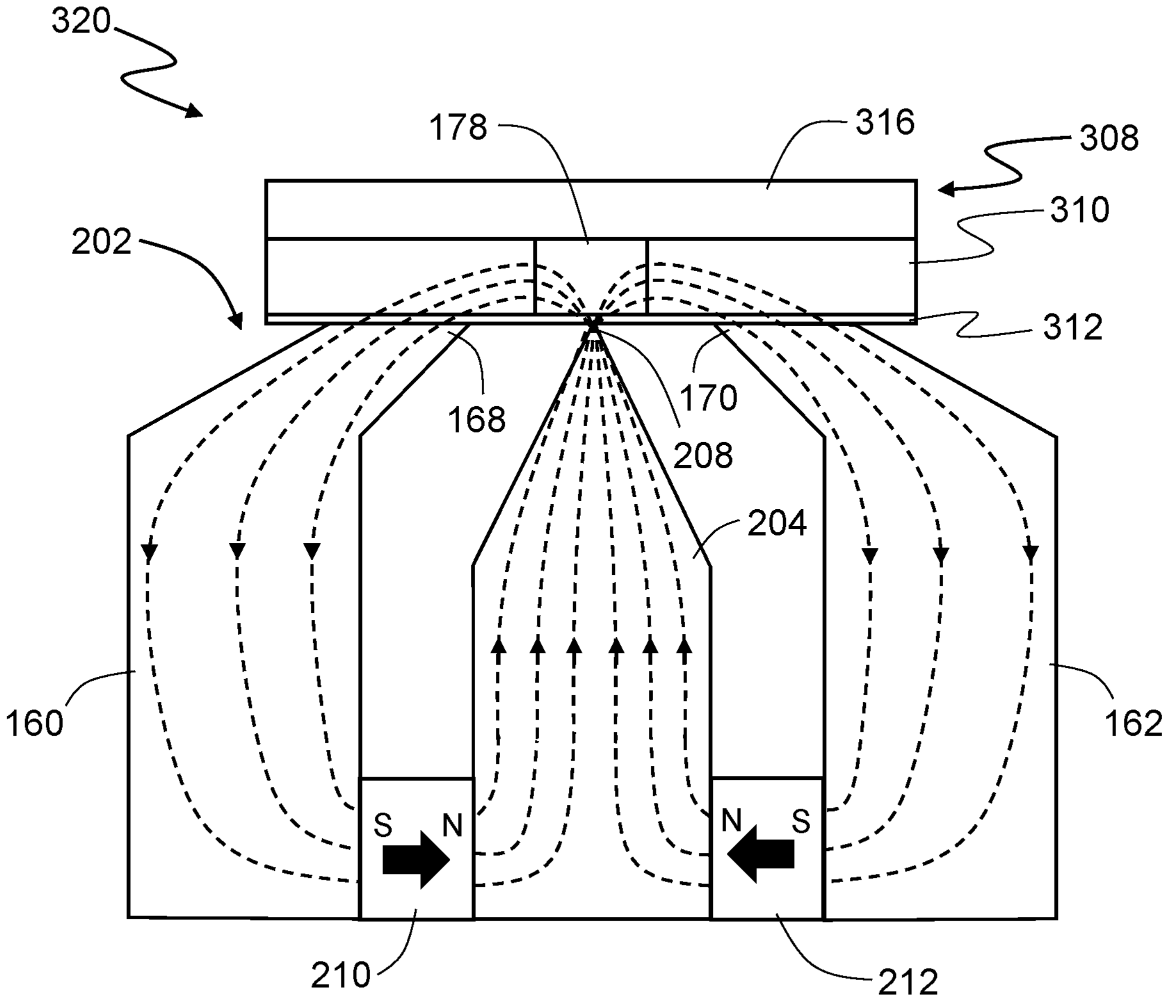
FIG. 26 is a cross-sectional view of a magnetic separator device utilizing a channel plate with a magnetic substrate.

The use of a magnetic substrate 310 in the channel plate 308, which conducts magnetic flux from the magnetic poles and functions as a part of a magnetic field generator, may further strengthen the magnetic field in the channel 178 of the magnetic device 320 as shown in FIG. 26. The magnetic flux distribution in the magnetic device 320 is characterized by two flux loops. The first loop is characterized by the magnetic flux flowing from the first permanent magnet 210 to the soft magnetic center pole 204, the soft magnetic substrate 210 of the channel plate 308, the first soft magnetic side pole 160, and back to the first permanent magnet 210. The second loop is characterized by the magnetic flux flowing from the second permanent magnet 212 to the soft magnetic center pole 204, the soft magnetic substrate 310 of the channel plate 308, the second soft magnetic side pole 162, and back to the second permanent magnet 212. The magnetic flux will flow in opposite directions if the magnetization directions of the permanent magnets 210 and 212 are reversed.

Figure 27:
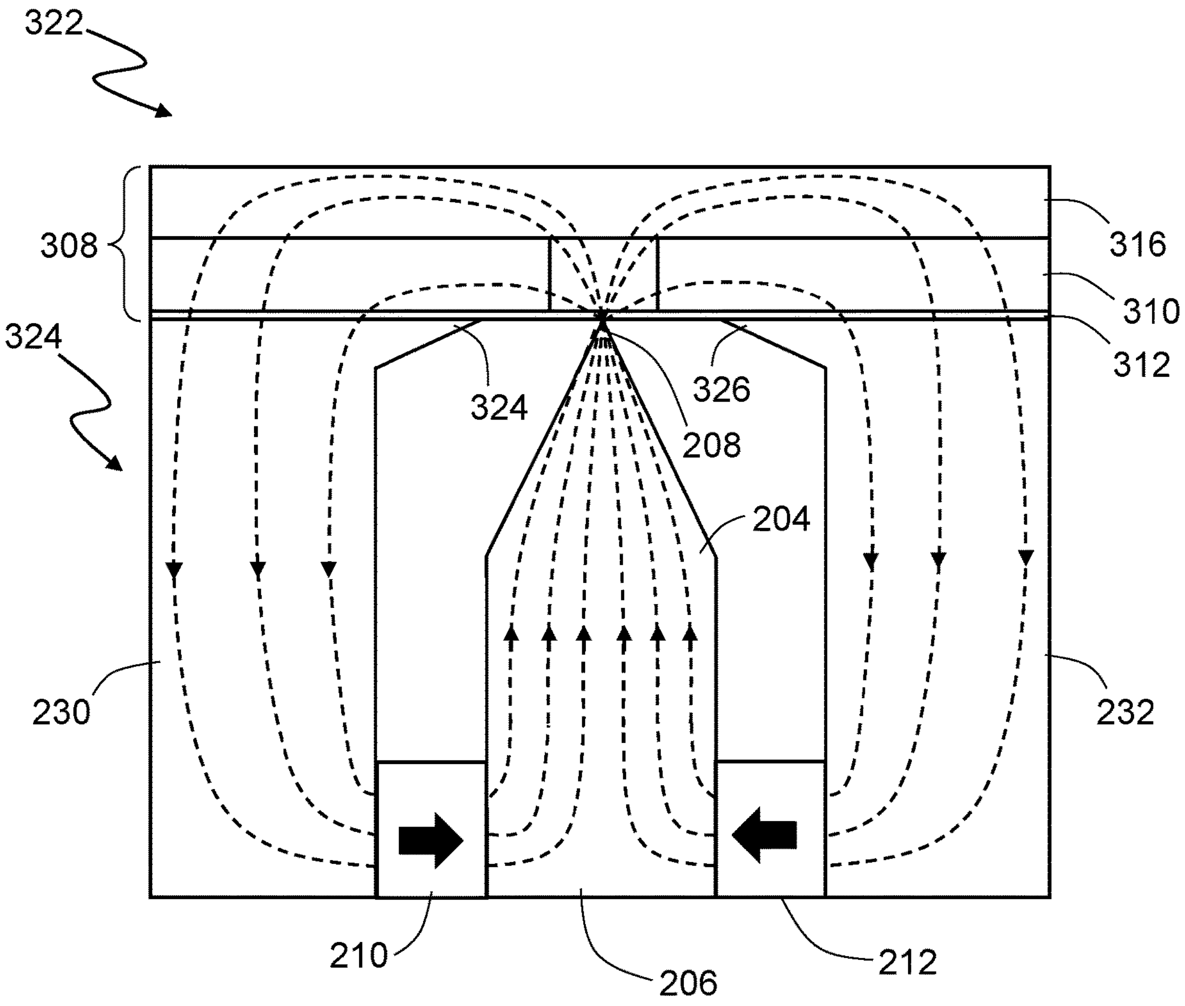
FIG. 27 is a cross-sectional view of a magnetic separator device utilizing a channel plate with a magnetic cover plate.

FIG. 27 shows a magnetic device 322 comprising a magnetic field generator 324 and a channel plate 308 that includes a soft magnetic second cover plate 316, a nonmagnetic substrate 310, and a nonmagnetic first cover plate 312. The magnetic field generator 324 has the side poles 230 and 232 of the magnetic field generator 228 shown in FIG. 14 and the magnetic flux source of the magnetic field generator 202 shown in FIG. 11. The magnetic flux distribution in the magnetic device 322 is characterized by four flux loops. The first loop is characterized by the magnetic flux flowing from the first permanent magnet 210 to the soft magnetic center pole 204, the soft magnetic second cover plate 316 of the channel plate 308, the first soft magnetic side pole 230, and back to the first permanent magnet 210. The second loop is characterized by the magnetic flux flowing from the first permanent magnet 210 to the soft magnetic center pole 204, the first soft magnetic side pole 230, and back to the first permanent magnet 210. The third loop is characterized by the magnetic flux flowing from the second permanent magnet 212 to the soft magnetic center pole 204, the soft magnetic second cover plate 316 of the channel plate 308, the second soft magnetic side pole 232, and back to the second permanent magnet 212. The fourth loop is characterized by the magnetic flux flowing from the second permanent magnet 212 to the soft magnetic center pole 204, the second soft magnetic side pole 232, and back to the second permanent magnet 212. The magnetic flux concentrated from the bottom end 206 to the tapered tip end 208 of the soft magnetic center pole 204 is divided between the first and second top ends 324, 326 and the soft magnetic second cover plate 316 of the channel plate 308. The magnetic flux in the soft magnetic second cover plate 306 of the channel plate 308 conducted from the tapered tip end 208 is further divided between the first and second soft magnetic side poles 230 and 232.

Figure 28:
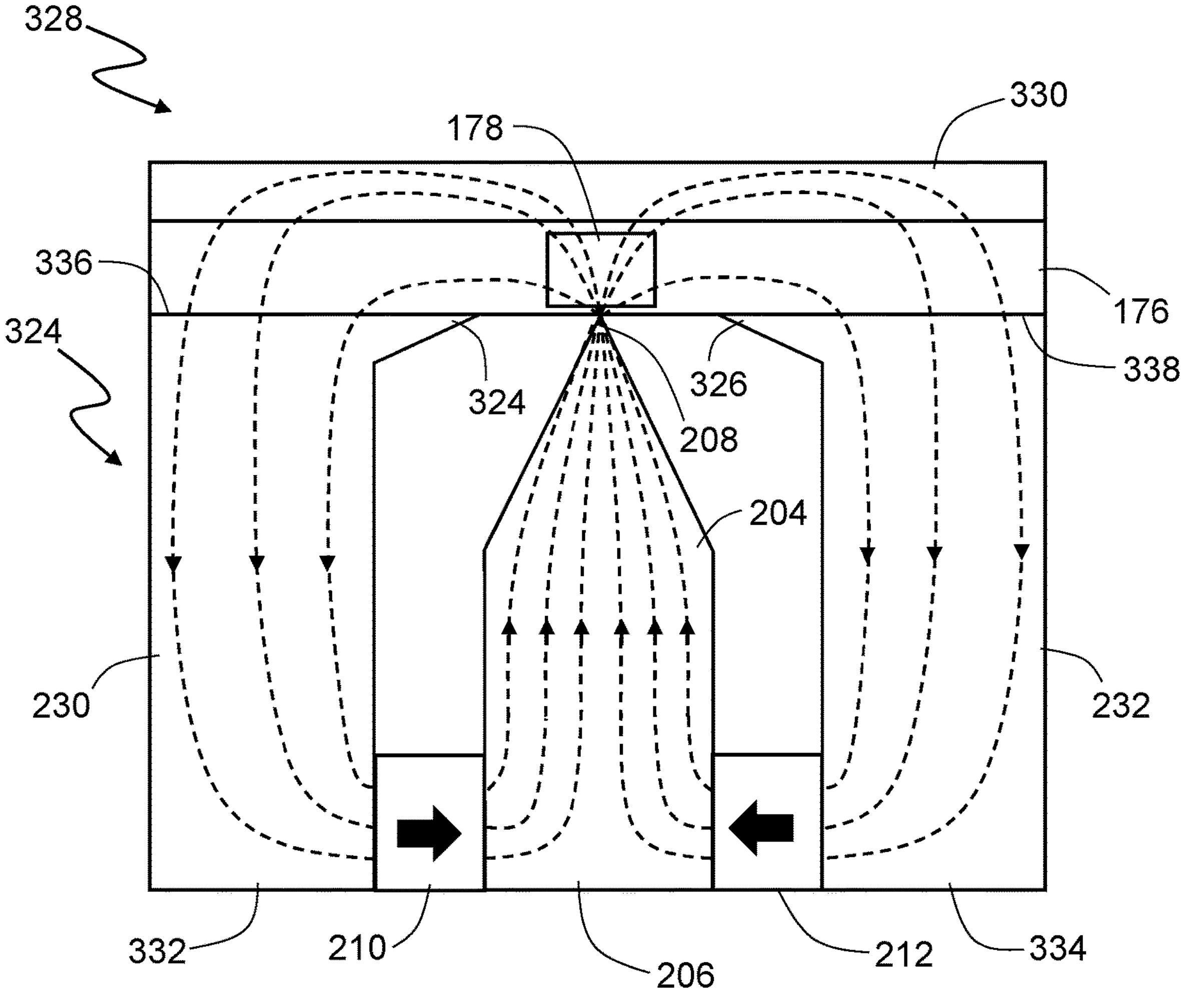
FIG. 28 is a cross-sectional view of a magnetic separator device utilizing a magnetic top shield in combination with a magnetic field generator.

The four-loop flux distribution may be similarly generated by a magnetic device 328 shown in FIG. 28. The magnetic device 328 includes a magnetic flux generator 324, a soft magnetic top shield 330 in the form of a plate, and a nonmagnetic channel plate 176 interposed between the magnetic flux generator 324 and the soft magnetic top shield 330. In this embodiment, the flux conduction functionality of the magnetic second cover plate 316 of the channel plate 308 shown in FIG. 27 is essentially replaced by the soft magnetic top shield 330. The soft magnetic top shield 330 may be detached or removed from the channel plate 176 to facilitate the removal of the channel plate 176 from the magnetic field generator 324 after a sorting operation.

The magnetic field generator 324 includes a soft magnetic center pole 204 having a bottom end 206 and a tapered tip end 208; a first soft magnetic side pole 230 and a second soft magnetic side pole 232 disposed on opposite sides of the soft magnetic center pole 204 and respectively having first and second bottom ends 332 and 334, the first and second soft magnetic side poles 230 and 232 respectively having first and second top ends 324 and 326 that bend or kink inward toward the soft magnetic center pole 204 with a first outward side 336 of the first top end 324 and a second outward side 338 of the second top end 326 being substantially coplanar; and a magnetic flux source or a means for generating magnetic flux in the soft magnetic center pole 204, the first and second soft magnetic side poles 230 and 232, and the soft magnetic top shield 330. The first and second soft magnetic side poles 230 and 232 may be substantially parallel to each other at or near their respective bottom ends 332 and 334. The magnetic device 328 further comprises a channel plate 176 including a channel 178 embedded therein and having a first planar surface that is operable to be in contact with or in close proximity to (e.g., 1 mm or less) the first and second outward sides 336 and 338 and a second planar surface that is operable to be in contact with or in close proximity to the soft magnetic top shield 330. The magnetic device 328 of FIG. 28 extends along a direction perpendicular to the cross section thereof.

The magnetic flux source or the means for generating the magnetic flux includes a first permanent magnet 210 disposed between the first soft magnetic side pole 230 and the soft magnetic center pole 204 and a second permanent magnet 212 disposed between the second soft magnetic side pole 232 and the soft magnetic center pole 204. The first and second permanent magnets 210 and 212 have opposite magnetization directions that are oriented substantially perpendicular to the soft magnetic center pole 204. In addition to the magnetic field generator 324 shown in FIG. 28, the soft magnetic top shield 330 may be used in combination with other magnetic field generators with any of the pole shapes shown in FIGS. 7 and 14-17 and any of the magnetic flux sources shown in FIGS. 7-13.

Figure 29:
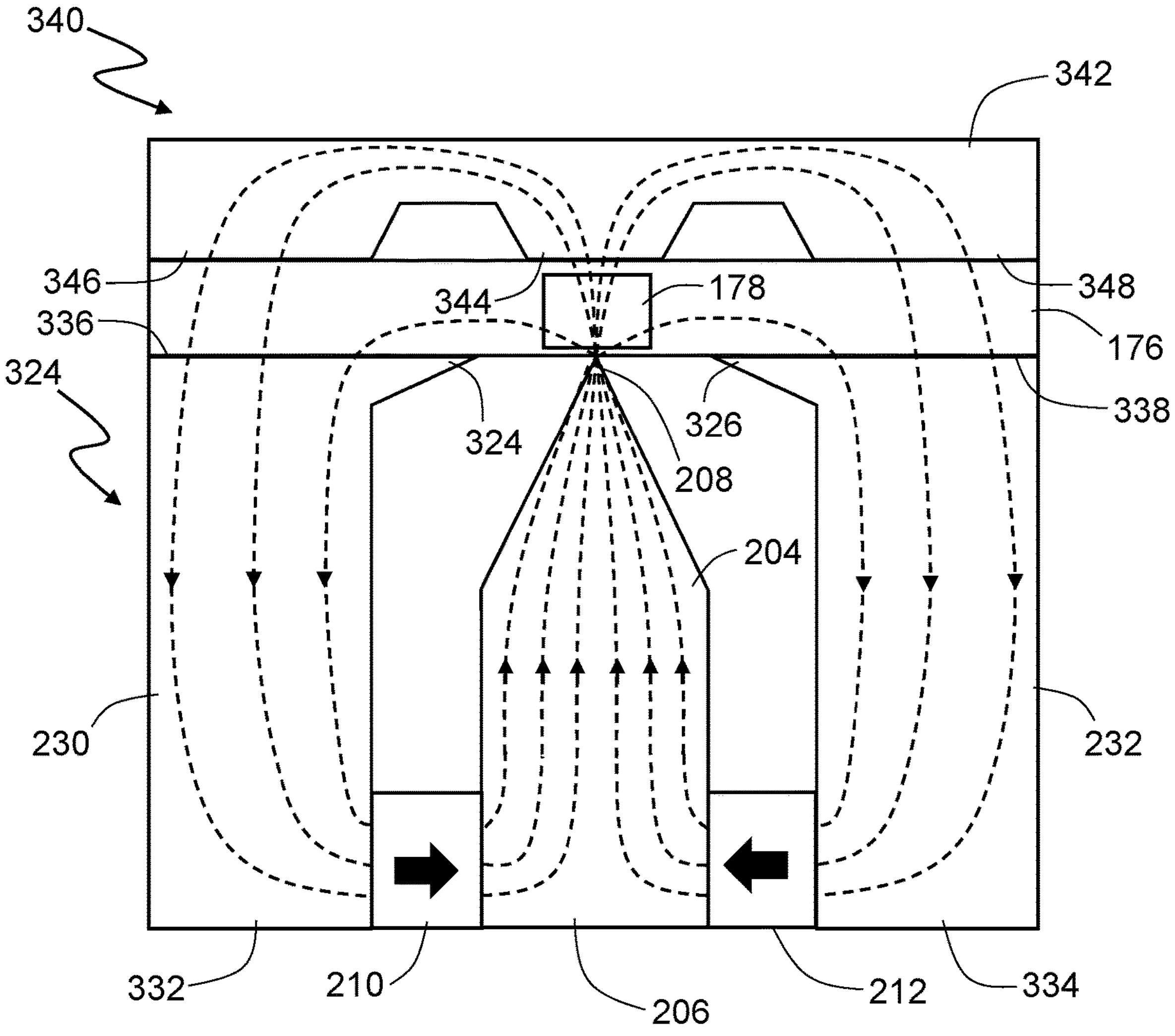
FIG. 29 is a cross-sectional view of a magnetic separator device utilizing another magnetic top shield in combination with a magnetic field generator.

The soft magnetic top shield 330 shown in FIG. 28 may be modified to further increase the magnetic field strength in the channel 178. FIG. 29 shows a magnetic device 340 that includes a magnetic field generator 324, a soft magnetic top shield 342, and a channel plate 176 interposed between the magnetic field generator 324 and the soft magnetic top shield 342. The channel plate 176 has a first planar surface that is operable to be in contact with or in close proximity to (e.g., 1 mm or less) the first and second outward sides 336 and 338 of the magnetic field generator 324 and a second planar surface that is operable to be in contact with or in close proximity to the soft magnetic top shield 342. The soft magnetic top shield 342 includes a center contact region 344 aligned to the channel 178 and the tapered tip end 208 of the soft magnetic center pole 204, a first side contact region 346 aligned to the first soft magnetic side pole 230, and a second side contact region 348 aligned to the second soft magnetic side pole 232. The three contact regions 344-348 of the soft magnetic top shield 342 are delineated by two trenches therebetween. The center contact region 344 conducts magnetic flux from/to the tapered tip end 208 of the soft magnetic center pole 204 through the channel plate 176. The first side contact region 346 conducts magnetic flux from/to the first outward side 336 of the first soft magnetic side pole 230 through the channel plate 176. The second side contact region 348 conducts magnetic flux from/to the second outward side 338 of the second magnetic side pole 232 through the channel plate 176. The soft magnetic top shield 342 may be detached or removed from the channel plate 176 to facilitate the removal of the channel plate 176 from the magnetic field generator 324 after the sorting operation.

The magnetic flux distribution in the magnetic devices 328, 340 of FIGS. 28 and 29 may be characterized by four flux loops. The first loop is characterized by the magnetic flux conducted from the first permanent magnet 210 to the soft magnetic center pole 204, the soft magnetic top shield 330/342, the first soft magnetic side pole 230, and back to the first permanent magnet 210. The second loop is characterized by the magnetic flux conducted from the first permanent magnet 210 to the soft magnetic center pole 204, the first soft magnetic side pole 230, and back to the first permanent magnet 210. The third loop is characterized by the magnetic flux conducted from the second permanent magnet 212 to the soft magnetic center pole 204, the soft magnetic top shield 330/342, the second soft magnetic side pole 232, and back to the second permanent magnet 212. The fourth loop is characterized by the magnetic flux flowing from the second permanent magnet 212 to the soft magnetic center pole 204, the second soft magnetic side pole 232, and back to the second permanent magnet 212. The magnetic flux concentrated from the bottom end 206 to the tapered tip end 208 of the soft magnetic center pole 204 is divided between the first and second top ends 324, 326 and the soft magnetic top shield 330/342. The magnetic flux in the soft magnetic top shield 330/342 conducted from the tapered tip end 208 is further divided between the first and second soft magnetic side poles 230 and 232.

Figure 30:
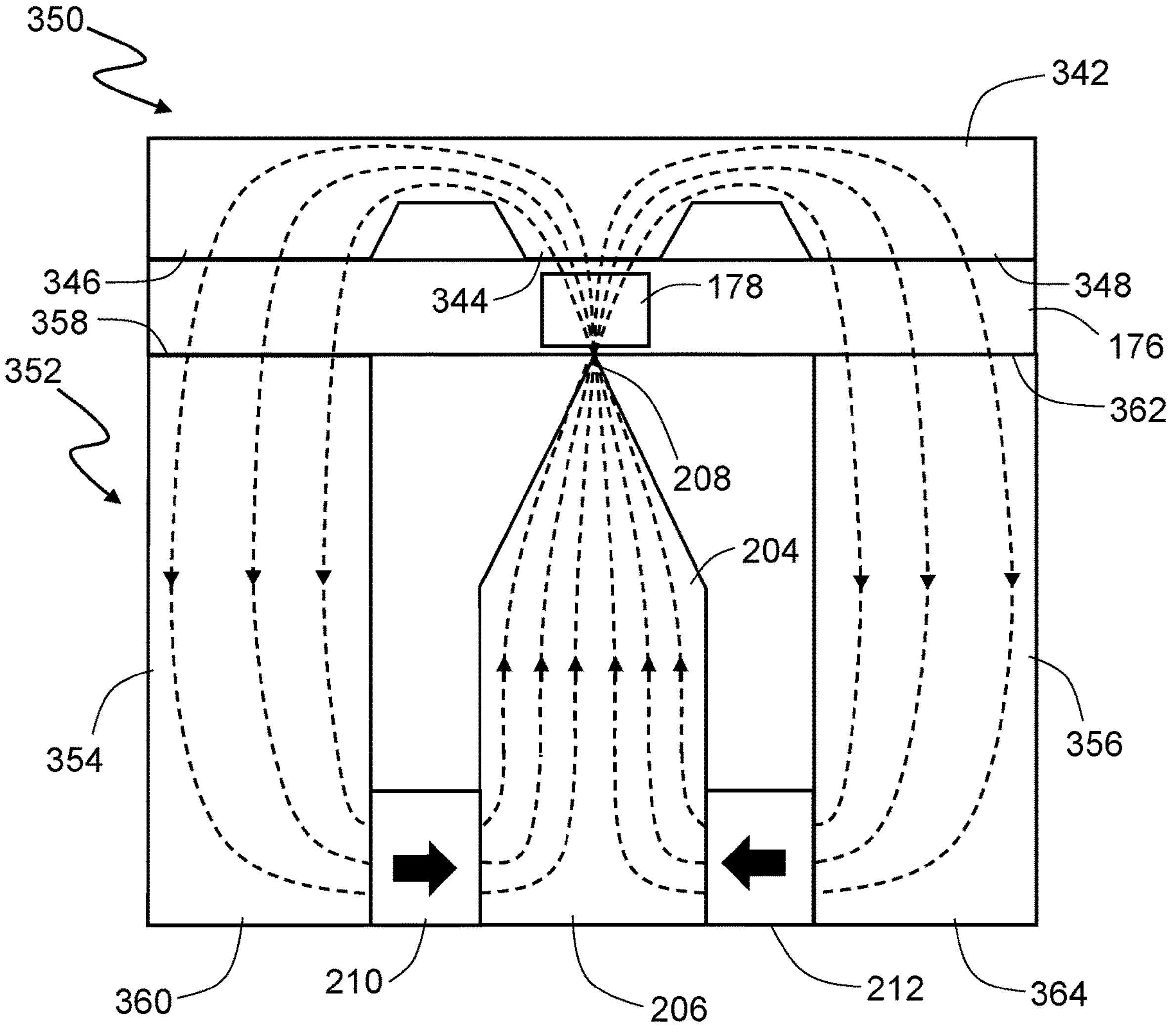
FIG. 30 is a cross-sectional view of a magnetic separator device including a magnetic top shield and a magnetic field generator with straight side poles.

The magnetic flux distribution shown in the magnetic device of FIG. 29 may be modified by using a different magnetic field generator 352 shown in FIG. 30. Unlike the other magnetic field generators which have bent or kinked soft magnetic side poles, the first and second soft magnetic side poles 354 and 356 of the magnetic field generator 352 shown in FIG. 30 are straight and may not form flux closures directly with the soft magnetic center pole 204. The first soft magnetic side pole 354 has a first top end 358 and a first bottom end 360. The second soft magnetic side pole 356 has a second top end 362 and a second bottom end 364. The first and second soft magnetic side poles 354 and 356 may be substantially parallel to each other. The channel plate 176 has a first planar surface that is operable to be in contact with or in close proximity to (e.g., 1 mm or less) the first and second top ends 358 and 362 and a second planar surface that is operable to be in contact with or in close proximity to the soft magnetic top shield 342. The soft magnetic top shield 342 may be detached or removed from the channel plate 176 to facilitate the removal of the channel plate 176 from the magnetic field generator 352 after the sorting operation.

The tapered tip end 208 of the soft magnetic center pole 204 conducts magnetic flux from/to the center contact region 344 of the soft magnetic top shield 342 through the channel plate 176. The first top end 358 of the first soft magnetic side pole 354 conducts magnetic flux from/to the first side contact region 346 of the soft magnetic top shield 342 through the channel plate 176. The second top end 362 of the second soft magnetic side pole 356 conducts magnetic flux from/to the second side contact region 348 of the soft magnetic top shield 342 through the channel plate 176. The magnetic flux distribution in the magnetic device 350 of FIG. 22 may be characterized by two flux loops. The first loop is characterized by the magnetic flux conducted from the first permanent magnet 210 to the soft magnetic center pole 204, the soft magnetic top shield 342, the first soft magnetic side pole 354, and back to the first permanent magnet 210. The second loop is characterized by the magnetic flux conducted from the second permanent magnet 212 to the soft magnetic center pole 204, the soft magnetic top shield 342, the second soft magnetic side pole 356, and back to the second permanent magnet 212.

Figure 31:
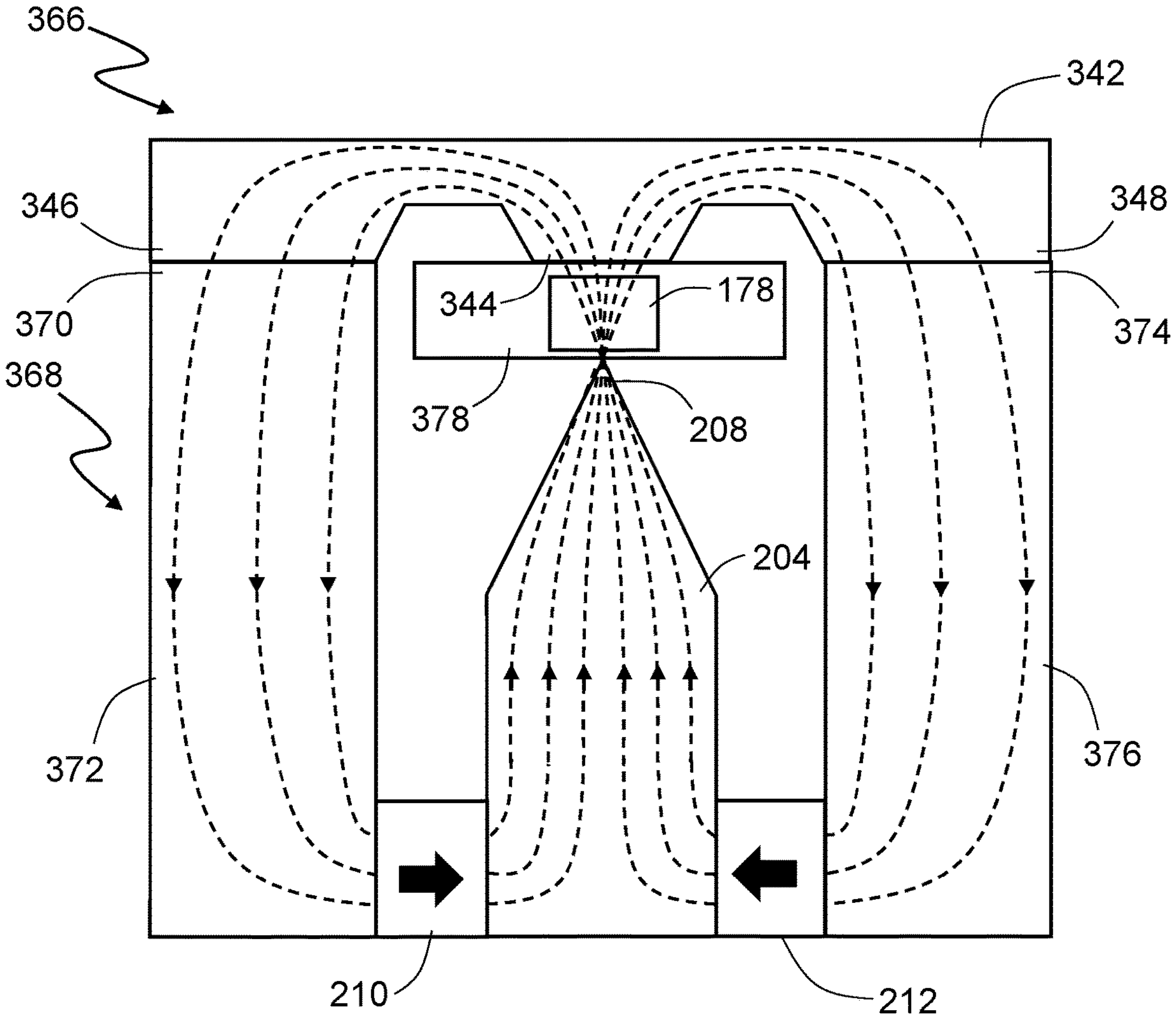
FIG. 31 is a cross-sectional view of a magnetic separator device including a magnetic field generator with straight side poles in contact with or in close proximity to a magnetic top shield.

The potential flux leakage between the soft magnetic top shield 342 and the soft magnetic side poles 354 and 356 may be minimized or eliminated by reducing the width of the channel plate 176 and bringing the first and second top ends 358 and 362 to be in contact with or in close proximity to (e.g., 2 mm or less) the first and second side contact regions 346 and 348, respectively. FIG. 31 shows such a magnetic device 366, wherein the magnetic field generator 368 includes a first top end 370 of a first soft magnetic side pole 372 and a second top end 374 of a second soft magnetic side pole 376 in contact with or in close proximity to the first and second side contact regions 346 and 348, respectively. The channel plate 378 has first and second planar surfaces that are operable to be in contact with or in close proximity to (e.g., 1 mm or less) the tapered tip end 208 of the soft magnetic center pole 204 and the center contact region 344 of the soft magnetic top shield 342, respectively. The channel plate 378 is surrounded by the soft magnetic top shield 342 and the magnetic field generator 368. The soft magnetic top shield 342 may be detached or removed from the channel plate 378 and the magnetic field generator 368 to facilitate the removal of the channel plate 378 from the magnetic field generator 368 after the sorting operation. Providing a gap between the first and second top ends 370 and 374 of the magnetic field generator 368 and the first and second side contact regions 346 and 348 of the soft magnetic top shield 342 would facilitate the subsequent removal of the soft magnetic top shield 342 after a sorting operation.

Figure 32:
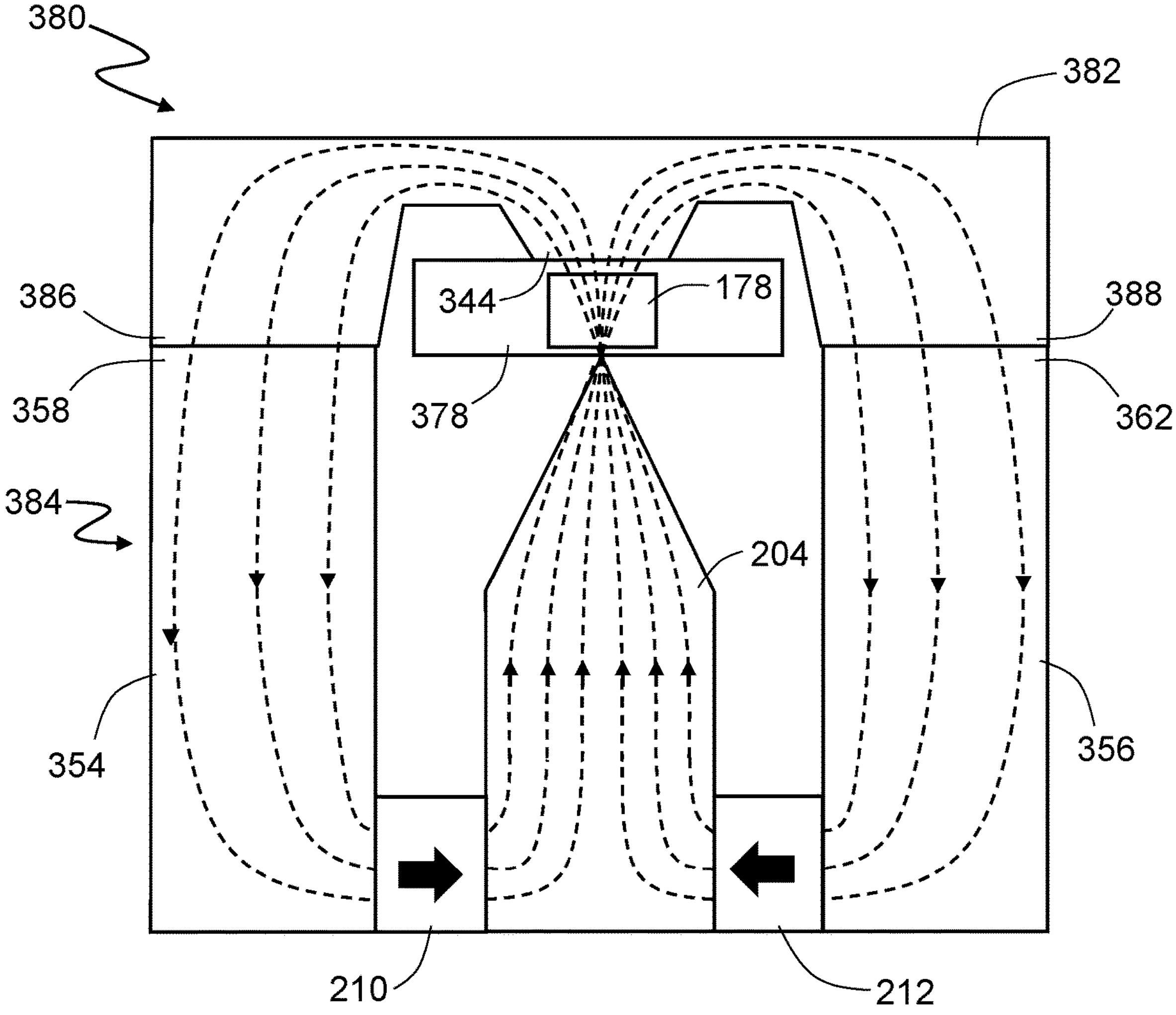
FIG. 32 is a cross-sectional view of another magnetic separator device including a magnetic field generator with straight side poles in contact with or in close proximity to a magnetic top shield.

FIG. 32 shows another magnetic device 380 that may reduce potential flux leakage between a soft magnetic top shield 382 and the magnetic field generator 384 by bringing the first and second side contact regions 386 and 388 to be in contact with or in close proximity to (e.g., 2 mm or less) the first and second top ends 358 and 362 of the first and second soft magnetic side poles 354 and 356, respectively. Unlike the soft magnetic top shield 342, whose contact regions 344-348 are essentially coplanar, the soft magnetic top shield 382 shown in FIG. 32 has the first and second side contact regions 386 and 388 that are not coplanar with the center contact region 344.

Figure 33A:
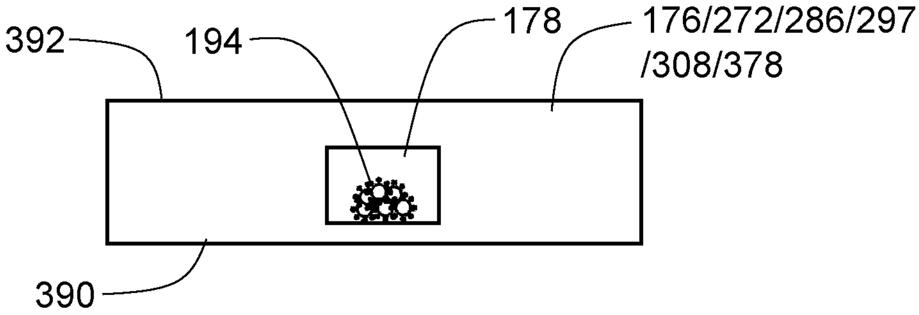
FIG. 33A is a cross-sectional view showing accumulation of magnetically labeled biological objects on the channel wall after a sorting operation.

After flowing a sample fluid containing magnetically labeled biological objects 194 through the channel 178 positioned in close proximity to a magnetic field generator, the magnetically labeled biological objects 194 may condense or accumulate to form one or more magnetic conglomerates or aggregates on the walls of the channel 178 of the channel plate 176/272/286/297/308/378, as shown in FIG. 33A. The channel plate 176/272/286/297/308/378, which includes a first planar surface 390 that is facing the magnetic field generator and a second planar surface 392, may then be removed from the magnetic field generator to demagnetize the magnetic conglomerates.

Figure 33B:
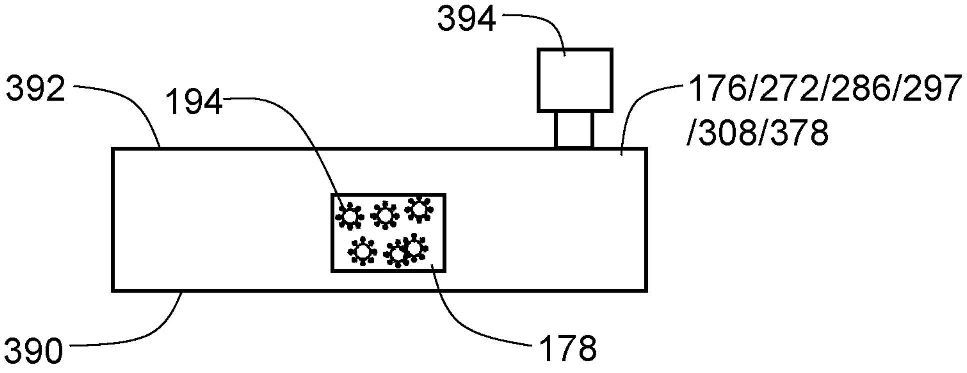
FIG. 33B is a cross-sectional view showing dissociation or disintegration of magnetic conglomerates in the channel into individual biological objects by using a motor to apply vibration force to the channel plate.
Figure 33C:
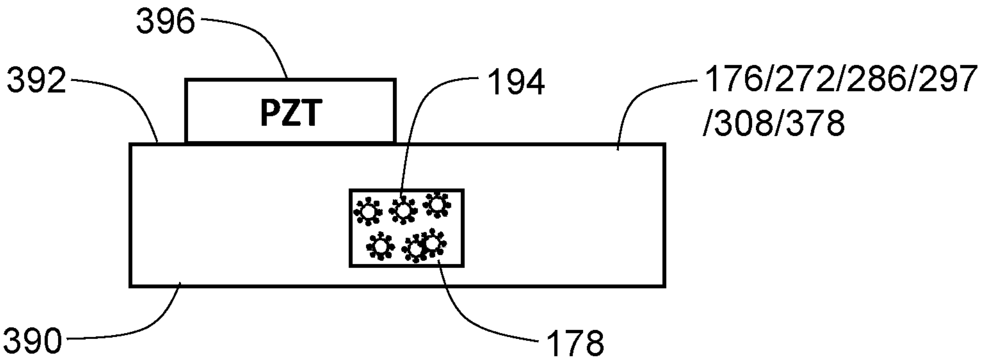
FIG. 33C is a cross-sectional view showing dissociation or disintegration of magnetic conglomerates in the channel into individual biological objects by using one or more piezoelectric transducers to apply vibration force to the channel plate.

The dissociation or disintegration of the magnetic conglomerates in the channel 178 into individual biological objects 194 may be facilitated by a mechanical means for applying vibration to the channel plate 176/272/286/297/308/378. FIG. 33B shows that a motor 394 that produces vibration may be reversibly coupled to the channel plate 176/272/286/297/308/378 and break up the magnetic conglomerates into individual biological objects 194. Another approach for applying vibration is to use a channel plate 176/272/286/297/308/378 with one or more piezoelectric transducers 396 attached to the first and/or second planar surface 390, 392 of the channel plate 176/272/286/297/308/378 as shown in FIG. 33C. The one or more piezoelectric transducers 396 may be permanently attached or bonded to the channel plate 176/272/286/297/308/378, becoming an integral part of the channel plate 176/272/286/297/308/378. Alternatively, the one or more piezoelectric transducers 396 may be reversibly attached to the channel plate 176/272/286/297/308/378 after it is removed from the magnetic field generator.

Figure 34:
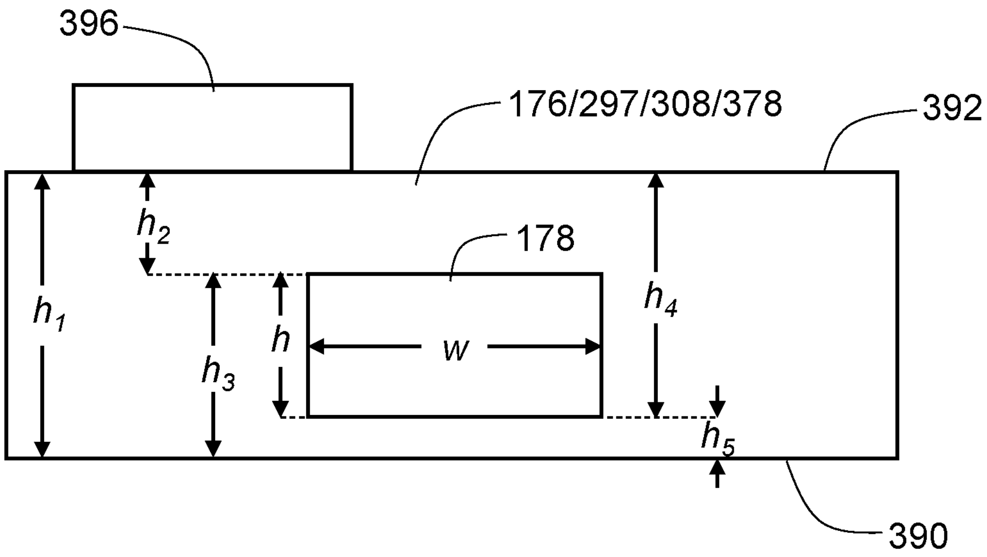
FIG. 34 is a cross-sectional view showing a channel plate and relevant dimensions.

When one or more piezoelectric transducers 396 are used as the mechanical means for applying vibration, each of the width (w) and height (h) of the channel 178, as shown in FIG. 34, may be an integer multiple of one-half wavelength of the acoustic wave in the sample fluid. Moreover, each of the channel plate thickness ($h_1$), height between the second planar surface 392 and the channel top wall ($h_2$), height between the first planar surface 390, which faces a magnetic field generator during operation, and the channel top wall ($h_3$), height between the second planar surface 392 and the channel bottom wall ($h_4$), and height between the first planar surface 390 and the channel bottom wall ($h_5$) may be an integer multiple of one-half wavelength of the acoustic wave traveling in the solid material(s) of the channel plate 176/272/286/297/308/378 itself.

The use of a mechanical means for applying vibration to the channel plate 176/272/286/297/308/378 to dissociate the magnetic conglomerates in the channel 178 into individual biological objects 194 may be applicable to a channel plate made of a single material or a channel plate composed of different materials as illustrated in FIGS. 23A/B and 25A/B. Moreover, the mechanical means for applying vibration to the channel plate 176/272/286/297/308/378 to dissociate the magnetic conglomerates as discussed above may be used after the sorting operation by any of the magnetic field generators disclosed herein (e.g., 152, 202, 218, 226, 228, 234-238, 274, 284, 290, 296, 324, 352, 368, 384).

Figure 35:
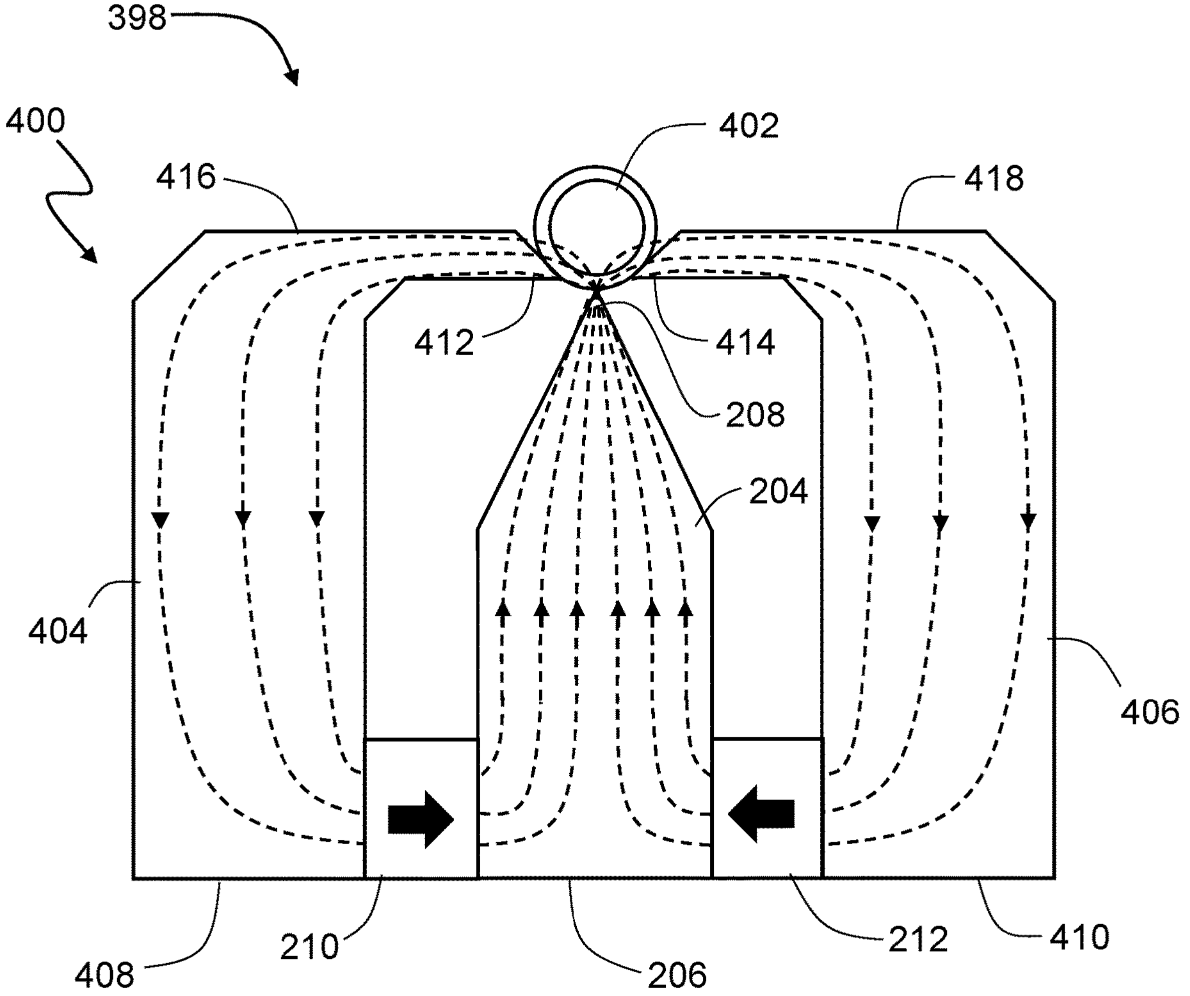
FIG. 35 is a cross-sectional view of a magnetic separator device having a conduit nestled in the gap formed between the pole tips of a magnetic field generator.

FIG. 35 is a cross-sectional view showing a magnetic device 398 that includes a magnetic field generator 400 and a conduit 402 for flowing a sample fluid for sorting instead of a channel plate. The magnetic field generator 400 includes a soft magnetic center pole 204 having a bottom end 206 and a tapered tip end 208; a first soft magnetic side pole 404 and a second soft magnetic side pole 406 disposed on opposite sides of the soft magnetic center pole 204 and respectively having first and second bottom ends 408 and 410, the first and second soft magnetic side poles 404 and 406 respectively having first and second top ends 412 and 414 that bend or kink inward toward the soft magnetic center pole 204 to form a first outward side 416 of the first top end 412 and a second outward side 418 of the second top end 414; and a magnetic flux source or a means for generating magnetic flux in the soft magnetic center pole 204 and the first and second soft magnetic side poles 404 and 406. The portion of the first soft magnetic side pole 404 between the first top end 412 and the kink, which may be horizontal and perpendicular to the main body of the pole 404, may have a constant width that is substantially narrower than the width at the first bottom end 408. Similarly, the portion of the second soft magnetic side pole 406 between the second top end 414 and the kink, which may be horizontal and perpendicular to the main body of the pole 406, may have a constant width that is substantially narrower than the width at the second bottom end 410. The first and second soft magnetic side poles 404 and 406 may be substantially parallel to each other at or near their respective bottom ends 408 and 410.

The first and second top ends 412 and 414 may each have a chisel edge profile with the bevel side facing upward or outward away from the soft magnetic center pole. The tapered tip end 208 may be positioned below the first and second outward sides 416, 418 or the first and second top ends 412 and 414. The conduit 402 may be nestled in the gap formed between the tapered tip end 208 and the bevels of the first and second top ends 412 and 414.

The magnetic flux source or the means for generating the magnetic flux includes a first permanent magnet 210 disposed between the first soft magnetic side pole 404 and the soft magnetic center pole 204 and a second permanent magnet 212 disposed between the second soft magnetic side pole 406 and the soft magnetic center pole 204. The first and second permanent magnets 210 and 212 have opposite magnetization directions that may be oriented substantially perpendicular to the soft magnetic center pole 204. The N faces of the permanent magnets 210 and 212 may be disposed adjacent to the soft magnetic center pole 204 as shown in FIG. 35. Alternatively, the S faces of the permanent magnets 210 and 212 may be disposed adjacent to the soft magnetic center pole 204 (not shown). Both configurations would generate magnetic flux that is concentrated from the bottom end 206 to the tapered tip end 208 of the soft magnetic center pole 204 and is divided between the first and second top ends 412, 414. The magnetic flux forms a first flux closure between the soft magnetic center pole 204 and the first soft magnetic side pole 404 and a second flux closure between the soft magnetic center pole 204 and the second soft magnetic side pole 406. The magnetic field generator 400 may alternatively utilize other magnetic flux sources, such as those shown in FIGS. 7-13.

The conduit 402 may be made of a flexible or pliable material, such as but not limited to rubber, plastic, or other polymeric materials. The conduit 402 may be operable to be pressed and deformed against the bevel surfaces of the first and second top ends 412, 414 and/or the tapered tip end 208 by a press 420 as shown in the magnetic device 422 of FIG. 36, thereby allowing the sample fluid to flow in closer proximity to the first and second top ends 412, 414 and the tapered tip end 208 to experience higher magnetic field gradient. The press 420 may be made of a soft magnetic material or a material with relatively high magnetic permeability that comprises any one of iron (Fe), cobalt (Co), nickel (Ni), or any combination thereof. The soft magnetic press 420 may function like the soft magnetic top shields 330 and 342 shown in FIGS. 28 and 29 to generate the magnetic flux distribution characterized by four flux loops. The first loop is characterized by the magnetic flux flowing from the first permanent magnet 210 to the soft magnetic center pole 204, the soft magnetic press 420, the first soft magnetic side pole 404, and back to the first permanent magnet 210. The second loop is characterized by the magnetic flux flowing from the first permanent magnet 210 to the soft magnetic center pole 204, the first soft magnetic side pole 404, and back to the first permanent magnet 210. The third loop is characterized by the magnetic flux flowing from the second permanent magnet 212 to the soft magnetic center pole 204, the soft magnetic press 420, the second soft magnetic side pole 406, and back to the second permanent magnet 212. The fourth loop is characterized by the magnetic flux flowing from the second permanent magnet 212 to the soft magnetic center pole 204, the second soft magnetic side pole 406, and back to the second permanent magnet 212. The magnetic flux concentrated from the bottom end 206 to the tapered tip end 208 of the soft magnetic center pole 204 is divided between the first and second top ends 412, 414 and the soft magnetic press 420. The magnetic flux in the soft magnetic press 420 conducted from the tapered tip end 208 is further divided between the first and second soft magnetic side poles 404 and 406.

Figure 36:
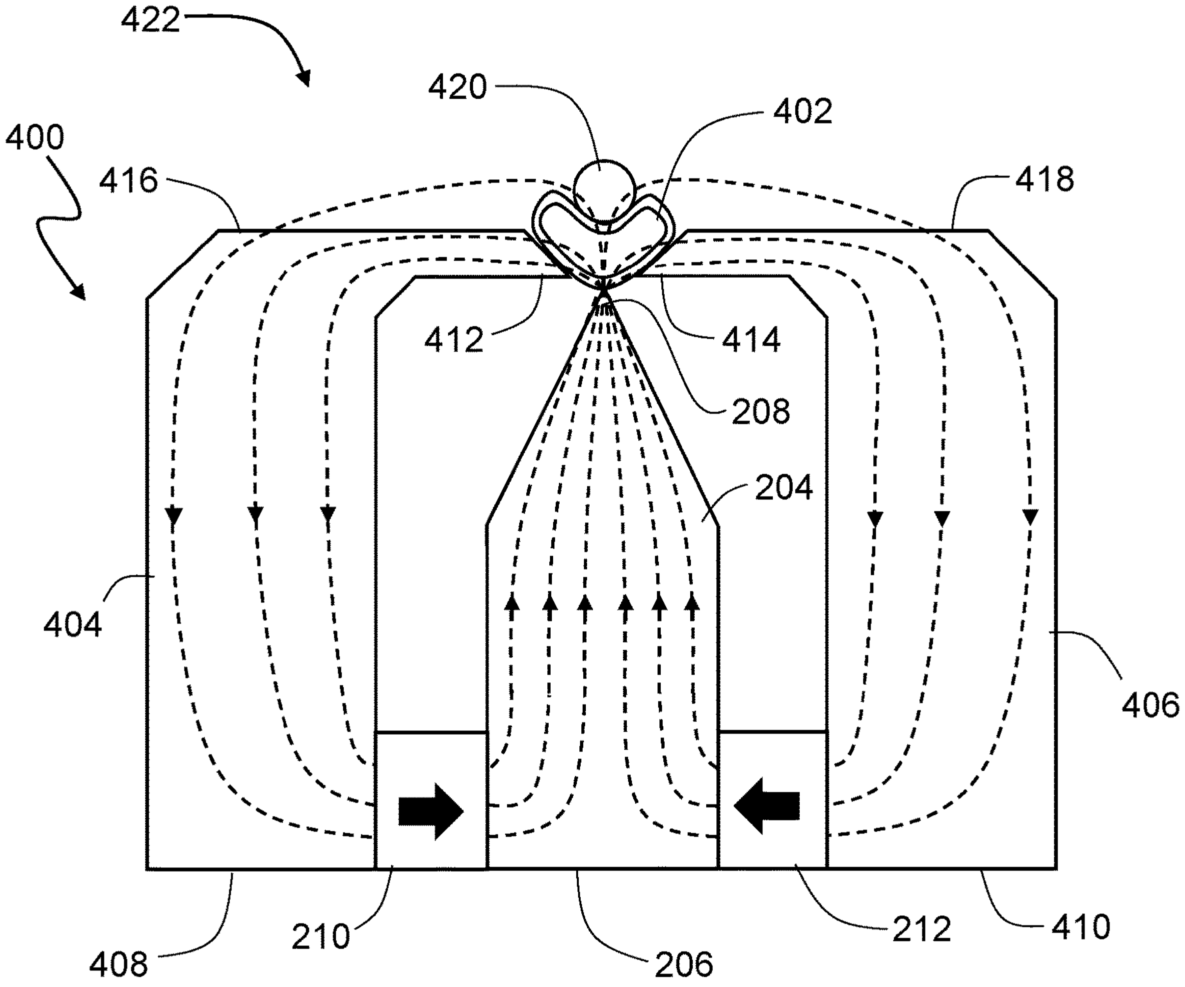
FIG. 36 is a cross-sectional view showing a press pushing the conduit against the gap formed between the pole tips of a magnetic field generator.
Figure 37:
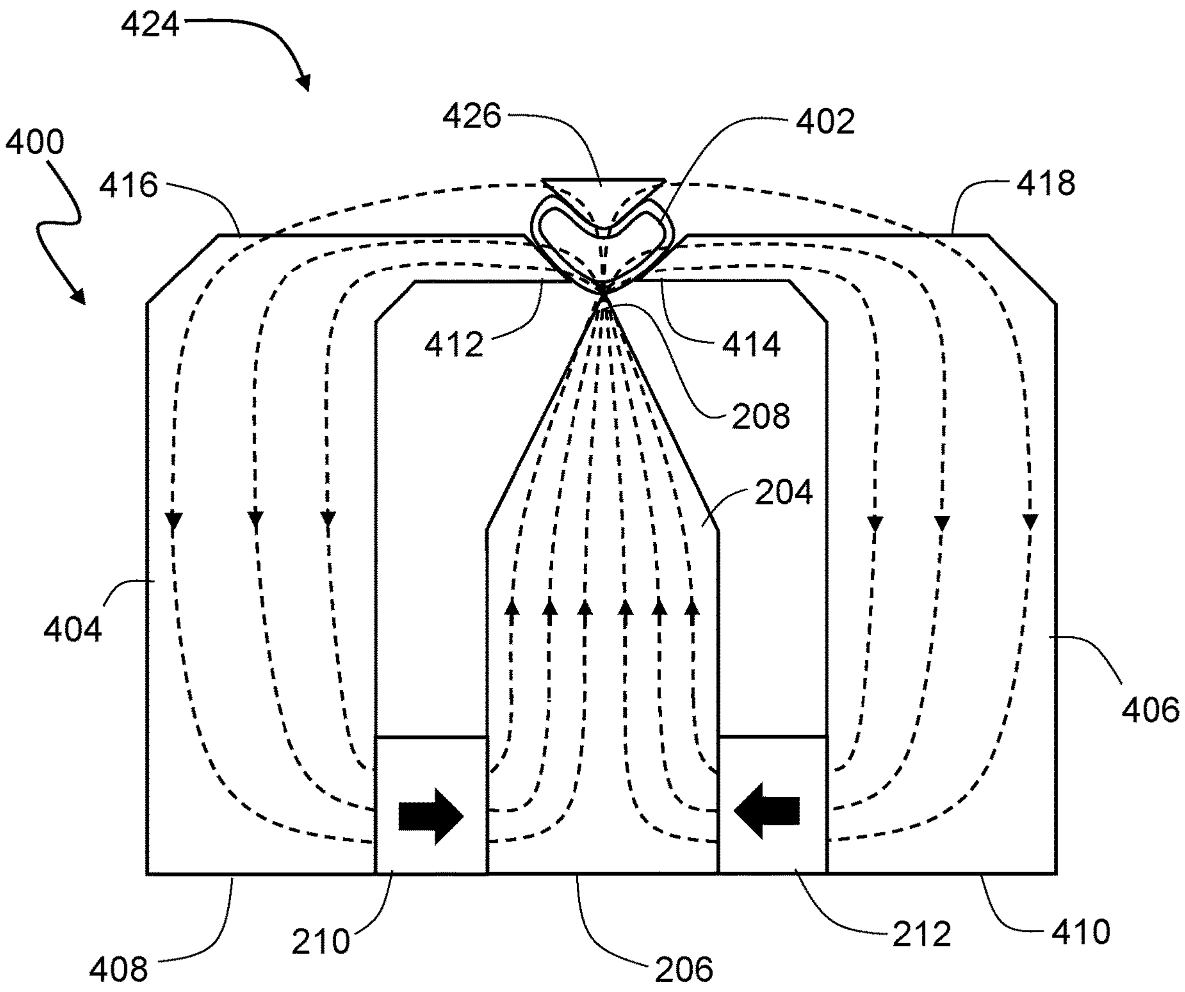
FIG. 37 is a cross-sectional view showing another press pushing the conduit against the gap formed between the pole tips of a magnetic field generator.

The soft magnetic press 420 shown in FIG. 36 may have other shapes. For example, FIG. 37 shows another magnetic device 424 with a soft magnetic press 426 that is operable to press the conduit 402 against the bevel surfaces of the first and second top ends 412, 414 and/or the tapered tip end 208. The soft magnetic press 426 has a triangular shape that may be substantially conformal to the gap formed between the tapered tip end 208 and the bevels of the first and second top ends 412 and 414. The soft magnetic press 426 may also conduct the magnetic flux with the first and second soft magnetic side poles 404 and 406 more efficiently.

What is claimed is:

1. A magnetic device comprising:

a soft magnetic center pole having a bottom end and a tapered tip end;

first and second soft magnetic side poles disposed on opposite sides of the soft magnetic center pole, the first soft magnetic side pole having a first bottom end and a first top end, the second soft magnetic side pole having a second bottom end and a second top end, the first and second top ends each having a chisel edge profile with a bevel side facing outward away from the soft magnetic center pole;

a magnetic flux source generating magnetic flux in the soft magnetic center pole and the first and second soft magnetic side poles;

a flexible conduit nestled in a gap formed between the tapered tip end and the bevel sides of the first and second top ends; and a soft magnetic press operable to push and deform the flexible conduit nestled in the gap, wherein the magnetic flux forms a first flux loop between the soft magnetic center pole, the soft magnetic press, and the first soft magnetic side pole and a second flux loop between the soft magnetic center pole, the soft magnetic press, and the second soft magnetic side pole.

2. The magnetic device of claim 1, wherein the magnetic flux source includes a soft magnetic bottom shield and a permanent magnet disposed between the soft magnetic bottom shield and the bottom end of the soft magnetic center pole, wherein the first and second bottom ends are disposed above the soft magnetic shield.

3. The magnetic device of claim 1, wherein the magnetic flux source includes a soft magnetic bottom shield, a first permanent magnet disposed between the first bottom end and the soft magnetic bottom shield, a second permanent magnet disposed between the second bottom end and the soft magnetic bottom shield, and a third permanent magnet disposed between the bottom end of the soft magnetic center pole and the soft magnetic bottom shield, wherein a magnetization direction of the third permanent magnet is opposite to magnetization directions of the first and second permanent magnets.

4. The magnetic device of claim 1, wherein the magnetic flux source includes a first permanent magnet disposed beneath the first bottom end, a second permanent magnet disposed beneath the second bottom end, and a third permanent magnet disposed beneath the bottom end of the soft magnetic center pole, wherein a magnetization direction of the third permanent magnet is opposite to magnetization directions of the first and second permanent magnets.

5. The magnetic device of claim 1, wherein the magnetic flux source includes a first permanent magnet disposed between the first soft magnetic side pole and the soft magnetic center pole and a second permanent magnet disposed between the second soft magnetic side pole and the soft magnetic center pole, wherein the first and second permanent magnets have opposite magnetization directions.

6. The magnetic device of claim 1, wherein the first and second top ends bend inward toward the soft magnetic center pole.

7. The magnetic device of claim 1, wherein the magnetic flux is concentrated from the bottom end to the tapered tip end of the soft magnetic center pole and is divided between the soft magnetic press and the first and second top ends.

8. The magnetic device of claim 1, wherein the flexible conduit is in contact with the bevel sides of the first and second top ends.

9. The magnetic device of claim 1, wherein the first and second soft magnetic side poles are parallel at the first and second bottom ends, respectively.

10. The magnetic device of claim 9, wherein the first and second top ends bend inward toward the soft magnetic center pole.

11. The magnetic device of claim 10, wherein the first and second top ends are positioned above the tapered tip end.

12. The magnetic device of claim 1, wherein the soft magnetic press has a circular cross section.

13. The magnetic device of claim 1, wherein the soft magnetic press has a triangular cross section.

* * * * *